US012741844B2

(12) United States Patent
Harada

(10) Patent No.: US 12,741,844 B2
(45) Date of Patent: Sep. 22, 2026

(54) PRINTING SYSTEM, AND METHOD FOR CONTROLLING PRINTING SYSTEM

(71) Applicant: SEIKO EPSON CORPORATION, Tokyo (JP)

(72) Inventor: Yutaro Harada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 18/732,361

(22) Filed: Jun. 3, 2024

(65) Prior Publication Data

US 2024/0400338 A1 Dec. 5, 2024

(30) Foreign Application Priority Data

Jun. 5, 2023 (JP) ................................ 2023-092199
Jun. 20, 2023 (JP) ................................ 2023-100592

(51) Int. Cl.
*B65H 37/06* (2006.01)
*B41J 3/44* (2006.01)
(Continued)

(52) U.S. Cl.
CPC ................ *B65H 37/06* (2013.01); *B41J 3/44* (2013.01); *B65H 29/60* (2013.01); *B65H 37/04* (2013.01);
(Continued)

(58) Field of Classification Search
CPC .......... B41L 43/02; B41L 43/06; B41L 43/12; G03G 2215/00827; G03G 2215/00877; B65H 37/04; B65H 37/06; B65H 2301/51611; B65H 2301/45; B65H 29/60; B65H 45/04
(Continued)

(56) References Cited

U.S. PATENT DOCUMENTS 6,351,625 B1 * 2/2002 Sato ...................... B65H 45/18
399/382
7,946,563 B2 * 5/2011 Fukasawa .......... G03G 15/6582
270/32
(Continued)

FOREIGN PATENT DOCUMENTS

JP 2021-042038 A 3/2021
JP 2022-138290 A 9/2022

*Primary Examiner* — Leslie A Nicholson, III
(74) *Attorney, Agent, or Firm* — WORKMAN NYDEGGER

(57) ABSTRACT

A printing system includes a printing apparatus that performs printing on a medium, a post-processing apparatus including a folding process section that performs a folding process of folding a medium bundle formed of a plurality of the media, and a control apparatus, the post-processing apparatus including a post-processing section that performs post-processing different from the folding process of folding the media, and the control apparatus, when the folding process is performed on a plurality of medium bundles, causing the printing apparatus to start a printing process on a first medium of the medium of a second medium bundle after printing on a last medium of the media of the first medium bundle ends but before the folding process on the first medium bundle starts, and puts the printed first medium on standby in the post-processing section until the folding process on the first medium bundle ends.

9 Claims, 17 Drawing Sheets

(51) Int. Cl.
*B65H 29/60* (2006.01)
*B65H 37/04* (2006.01)

(52) U.S. Cl.
CPC .................. *B65H 2301/424* (2013.01); *B65H 2301/51611* (2013.01); *B65H 2513/51* (2013.01)

(58) Field of Classification Search
USPC .......................................... 270/32, 37, 58.08
See application file for complete search history.

(56) References Cited

U.S. PATENT DOCUMENTS 9,045,308 B2 * 6/2015 Tamura .................. B65H 39/00
9,919,890 B2 * 3/2018 Nakano .................. B65H 29/14

* cited by examiner

PRINTING SYSTEM, AND METHOD FOR CONTROLLING PRINTING SYSTEM

The present application is based on, and claims priority from JP Application Serial Number 2023-092199, filed Jun. 5, 2023, and JP Application Serial Number 2023-100592, filed Jun. 20, 2023, the disclosure of which is hereby incorporated by reference herein in its entirety.

BACKGROUND

1. Technical Field

The present disclosure relates to a printing system and a method for controlling the printing system.

2. Related Art

JP-A-2022-138290 discloses a system including a recording unit that performs recording on a sheet, which is an example of a medium, and a center folding unit that performs center folding on a sheet bundle that is a stack of a plurality of recorded sheets. The recording unit is an example of a printing apparatus, and the center folding unit is an example of a post-processing apparatus.

JP-A-2022-138290 is an example of the related art.

According to JP-A-2022-138290, the center folding process of performing center folding on a medium bundle starts from the step of conveying a medium to the printing head of the printing apparatus and ends at the step of discharging the medium bundle having undergone the center folding out of the post-processing apparatus. In the system described in JP-A-2022-138290, after the center folding process performed on one medium bundle is completed, the center folding process on the next medium bundle is initiated. The related-art system has room for improvement in performing the center folding process on a plurality of medium bundles.

SUMMARY

A printing system includes a printing apparatus including a printing section that ejects a liquid to perform printing on a medium with the liquid, a post-processing apparatus including a folding process section that performs a folding process of folding a medium bundle formed of a plurality of the media on which the printing apparatus performs the printing, and a control apparatus that controls the printing apparatus and the post-processing apparatus, the printing apparatus further including a first conveyance portion that conveys the plurality of media, which constitute the medium bundle, to the post-processing apparatus in a printing order, the post-processing apparatus further including a second conveyance portion that conveys the media received from the printing apparatus in the printing order, and a post-processing section that performs post-processing different from the folding process on the media, the folding process section including a tray in which the plurality of media are sequentially stacked on each other whenever conveyed by the second conveyance portion to form the medium bundle, and a folding mechanism that performs the folding process on the formed medium bundle, and the control apparatus, assuming that the folding process is performed on a plurality of the medium bundles, that one of the plurality of medium bundles is a first medium bundle, and that the medium bundle following the first medium bundle is a second medium bundle, causing the printing apparatus to start a printing process on a first medium of the medium of the second medium bundle after printing on a last medium of the media of the first medium bundle ends but before the folding process on the first medium bundle starts, and putting the printed first medium on standby in the post-processing section until the folding process on the first medium bundle ends.

A method for controlling a printing system including a printing apparatus including a printing section that ejects a liquid to perform printing on a medium with the liquid, and a post-processing apparatus including a folding process section that performs a folding process of folding a medium bundle formed of a plurality of the media on which the printing apparatus performs the printing, the printing apparatus further including a first conveyance portion that conveys the plurality of media, which constitute the medium bundle, to the post-processing apparatus in a printing order, the post-processing apparatus further including a second conveyance portion that conveys the media received from the printing apparatus in the printing order, and a post-processing section that performs post-processing different from the folding process on the media, the folding process section including a tray in which the plurality of media are sequentially stacked on each other whenever conveyed by the second conveyance portion to form the medium bundle, and a folding mechanism that performs the folding process on the formed medium bundle, the method including assuming that the folding process is performed on a plurality of the medium bundles, that one of the plurality of medium bundles is a first medium bundle, and that the medium bundle following the first medium bundle is a second medium bundle, and causing the printing apparatus to start a printing process on a first medium of the medium of the second medium bundle after printing on a last medium of the media of the first medium bundle ends but before the folding process on the first medium bundle starts, and puts the printed first medium on standby in the post-processing section until the folding process on the first medium bundle ends.

DESCRIPTION OF EMBODIMENTS

Figure 1:
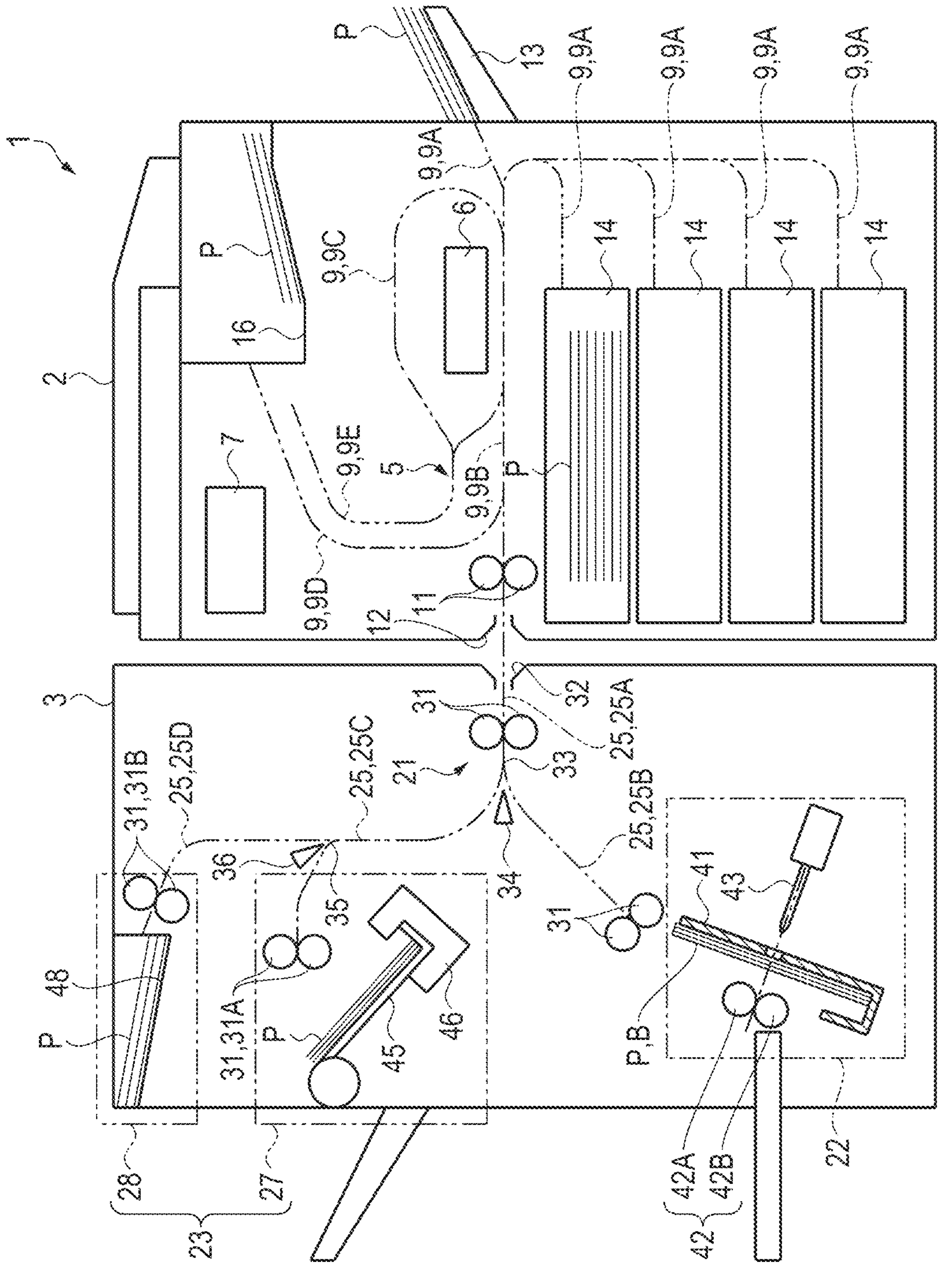
FIG. 1 is a diagrammatic view for illustrating the configuration of a first example of a printing system.

A printing system 1 according to a first example includes a printing apparatus 2 and a post-processing apparatus 3, as shown in FIG. 1. The printing apparatus 2 performs printing on a sheet P with ink. The ink is an example of a liquid. The sheet P is an example of a medium. In the present embodiment, the sheet P is a standard cut sheet. The cut sheet is also called a cut-form sheet. The post-processing apparatus 3 is an apparatus that performs a stapling process that is the process of stapling a plurality of sheets P, a folding process that is the process of bundling a plurality of sheets P and folding the bundle along the center line thereof, and other types of processing.

In the printing system 1, the printing apparatus 2 and the post-processing apparatus 3 are coupled to each other. In the printing system 1, the sheets P are conveyed from the printing apparatus 2 to the post-processing apparatus 3. The printing apparatus 2 and the post-processing apparatus 3 may be so coupled to each other that there is a gap between the printing apparatus 2 and the post-processing apparatus 3 as long as the sheets P are conveyed from the printing apparatus 2 to the post-processing apparatus 3. Another apparatus that relays the sheets P from the printing apparatus 2 to the post-processing apparatus 3 may be interposed between the printing apparatus 2 and the post-processing apparatus 3.

The printing apparatus 2 includes a printing conveyance portion 5, a printing head 6, and a control circuit 7. The printing conveyance portion 5 conveys the sheets P along a printing conveyance path 9 inside the printing apparatus 2. The printing conveyance portion 5 is an example of a first conveyance portion. The printing head 6 performs printing on each of the sheets P by ejecting the ink toward the sheet P conveyed by the printing conveyance portion 5. The printing head 6 is an example of a printing section. An inkjet head can be used as the printing head 6. A plurality of nozzle holes via which the ink is ejected are formed at the inkjet head. Printing is performed on the sheet P with the ink ejected from the nozzle holes.

The control circuit 7 controls the operation of the printing system 1. That is, the control circuit 7 collectively controls the operation of the printing apparatus 2 and the operation of the post-processing apparatus 3. The control circuit 7 is an example of a control apparatus. In the present embodiment, the printing apparatus 2 includes the control circuit 7. Note, however, that the control circuit 7 may be a component separate from the printing apparatus 2. The control circuit 7 may be an apparatus independent of each of the printing apparatus 2 and the post-processing apparatus 3. The post-processing apparatus 3 may include the control circuit 7. Both the printing apparatus 2 and the post-processing apparatus 3 may include the control circuit 7. The control circuit 7 may be divided into a plurality of circuits, and the plurality of circuits may be assigned to the printing apparatus 2 and the post-processing apparatus 3.

The printing conveyance portion 5 includes a plurality of conveyance roller pairs 11. The plurality of conveyance roller pairs 11 are arranged along the printing conveyance path 9. In FIG. 1, the printing conveyance path 9 is indicated by a two-dot chain line. FIG. 1 shows one of the plurality of conveyance roller pairs 11, and does not show the other conveyance roller pairs 11.

The conveyance roller pairs 11 are each disposed so as to be rotatable with the two rollers being in contact with each other via the outer circumferences thereof. The conveyance roller pairs 11 are each driven by rotational power applied to one of the two rollers. The printing conveyance portion 5 can convey a sheet P along the printing conveyance path 9 with the aid of the driven conveyance roller pairs 11 with the sheet P sandwiched between the two rollers of each of the conveyance roller pairs 11. A discharge port 12 is formed as a part of the printing apparatus 2. The discharge port 12 is formed as a part of the enclosure of the printing apparatus 2. The sheet P is delivered by the conveyance roller pairs 11 to the post-processing apparatus 3 via the discharge port 12. The printing conveyance path 9 includes a sheet feeding path 9A, a printing process path 9B, a sheet reversing path 9C, and a sheet discharging path 9D.

The printing head 6 faces the printing process path 9B of the printing conveyance path 9. The region of the printing process path 9B that faces the printing head 6 is called a printing region. The sheet feeding path 9A of the printing conveyance path 9 is a path along which the sheets P are guided to the printing region. The sheet feeding path 9A includes a path along which sheets P placed on a manual feed tray 13 are guided to the printing region, and a path along which sheets P from a cassette 14, which accommodates a plurality of sheets P, are guided to the printing region. The sheet feeding path 9A continues to the printing process path 9B. That is, the sheets P are continuously conveyed from the sheet feeding path 9A to the printing process path 9B. The sheet feeding path 9A of the printing conveyance path 9 is located upstream from the printing process path 9B in the direction in which the sheets P are conveyed.

The portion of the printing conveyance path 9 that is located upstream from the printing region in the direction in which the sheet P is conveyed is the sheet feeding path 9A. The printing process path 9B ends at the discharge port 12. That is, the printing process path 9B of the printing conveyance path 9 is the segment extending from the printing region, which faces the printing head 6, to the discharge port 12. The sheet reversing path 9C branches off the printing process path 9B. The sheet reversing path 9C is a path where the sheet P is reversed upside down. The sheet reversing path 9C allows double-sided printing to be performed on the sheet P. The sheet reversing path 9C branches off the printing process path 9B at a position downstream from the printing region in the direction in which the sheet P is conveyed.

The sheet reversing path 9C includes a sheet drawing-in path 9E. The sheet P directed from the printing process path 9B to the sheet reversing path 9C is guided to the sheet drawing-in path 9E. The sheet P drawn into the sheet drawing-in path 9E is directed in the opposite direction back to the sheet reversing path 9C. The sheet reversing path 9C bypasses the printing head 6 along the path opposite from the printing process path 9B, and joins the sheet feeding path 9A. The sheet P directed from the sheet drawing-in path 9E back to the sheet reversing path 9C is conveyed from the sheet feeding path 9A to the printing process path 9B. At this point in time, the sheet P is conveyed to the printing process path 9B with the sheet P reversed with respect to the state before directed to the sheet reversing path 9C.

The sheet discharging path 9D branches off the printing process path 9B. The sheet discharging path 9D branches off the printing process path 9B at a point downstream from the point where the sheet reversing path 9C branches off the printing process path 9B. The sheet discharging path 9D is a path along which the sheet P is ejected to a first stacker 16. The first stacker 16 is a receiver in which sheets P printed by the printing head 6 is accumulated. The sheets P can be discharged along the sheet discharging path 9D out of the printing apparatus 2 from the interior thereof. The sheets P are discharged along the sheet discharging path 9D out of the printing apparatus 2 without passing through the post-processing apparatus 3. A user who does not desire post-processing on a sheet P can receive the sheet P from the first stacker 16.

The post-processing apparatus 3 is located downstream from the printing process path 9B of the printing apparatus 2. The post-processing apparatus 3 includes a post-processing conveyance portion 21, a folding process section 22, and a post-processing section 23. The post-processing conveyance portion 21 conveys sheets P along a post-processing conveyance path 25 inside the post-processing apparatus 3. The post-processing conveyance portion 21 is an example of a second conveyance portion. The folding process section 22 is an apparatus that carries out a folding process of folding the sheets P. The center folding may include half folding and a variety of other folding methods, such as three-panel accordion folding, four-panel accordion folding, and Z-shaped folding. The post-processing section 23 performs post-processing different from the folding process on the sheets P. The post-processing section 23 includes a stapling process section 27 and a discharge process section 28. The stapling process section 27 performs a stapling process of stapling a plurality of sheets P. The discharge process section 28 discharges the sheets P out of the post-processing apparatus 3.

The post-processing conveyance portion 21 includes a plurality of conveyance roller pairs 31. The plurality of conveyance roller pairs 31 are arranged along the post-processing conveyance path 25. The example shown in FIG. 1 shows four conveyance roller pairs 31. The number of conveyance roller pairs 31 is, however, not limited to four. The conveyance roller pairs 31 are each disposed so as to be rotatable with the two rollers being in contact with each other via the outer circumferences thereof. The conveyance roller pairs 31 are each driven by rotational power applied to one of the two rollers. The post-processing conveyance portion 21 can convey a sheet P along the post-processing conveyance path 25 with the aid of the driven conveyance roller pairs 31 with the sheet P sandwiched between the two rollers of each of the conveyance roller pairs 31.

A reception port 32 is formed as part of the post-processing apparatus 3. The reception port 32 is an example of a reception section. The reception port 32 is formed as part of the enclosure of the post-processing apparatus 3. The sheet P is delivered by the conveyance roller pairs 31 from the printing apparatus 2 via the reception port 32. The post-processing conveyance path 25 includes a reception path 25A, a folding process path 25B, a stapling path 25C, and a sheet discharging path 25D. The reception path 25A is a path along which the sheet P delivered from the printing apparatus 2 to the post-processing apparatus 3 is received into the post-processing apparatus 3 via the reception port 32. The reception path 25A and the folding process path 25B are examples of a first conveyance path. The stapling path 25C is an example of a second conveyance path.

The reception path 25A branches into the folding process path 25B and the stapling path 25C at a position downstream from the reception port 32 in the direction in which the sheet P is conveyed. A first switcher 34 is provided at a first branch point 33, where the post-processing conveyance path 25 branches off into the folding process path 25B and the stapling path 25C. The first switcher 34 switches the destination of the conveyed sheet P between the folding process path 25B and the stapling path 25C. The folding process path 25B guides the sheet P to the folding process section 22. The stapling path 25C guides the sheet P to the stapling process section 27. The sheet discharging path 25D branches off the stapling path 25C. The sheet discharging path 25D guides the sheet P to the discharge process section 28.

The sheet discharging path 25D branches off the stapling path 25C at a position downstream from the first branch point 33 in the direction in which the sheet P is conveyed. The sheet discharging path 25D branches from the stapling path 25C at a point between the first branch point 33 and the stapling process section 27. A second branch point 35, where the sheet discharging path 25D branches off the stapling path 25C, is located downstream from the first branch point 33 in the direction in which the sheet P is conveyed. A second switcher 36 is provided at the second branch point 35. The second switcher 36 switches the destination of the conveyed sheet P between the stapling path 25C and the sheet discharging path 25D. In the example of the post-processing conveyance path 25 shown in FIG. 1, the folding process path 25B and the stapling path 25C branch off the reception path 25A at the first branch point 33, and the sheet discharging path 25D branches off the stapling path 25C at the second branch point 35. It may be considered from another point of view that the post-processing conveyance path 25 is so configured that the folding process path 25B and the sheet discharging path 25D branch off the reception path 25A at the first branch point 33, and the stapling path 25C branches off the sheet discharging path 25D at the second branch point 35.

The post-processing conveyance path 25 may instead have a configuration in which the stapling path 25C and the sheet discharging path 25D branch off the reception path 25A at the first branch point 33 and the folding process path 25B branches off the stapling path 25C at the second branch point 35. Still instead, the post-processing conveyance path 25 may have a configuration in which the stapling path 25C and the sheet discharging path 25D branch off the reception path 25A at the first branch point 33 and the folding process path 25B branches off the sheet discharging path 25D at the second branch point 35.

The folding process section 22 can perform the center folding on a sheet bundle B, which is a bundle of a plurality of sheets P. The sheet bundle B is a collection of a plurality of sheets P stacked on each other. The sheet bundle B is an example of a medium bundle. The folding process section 22 can fold the plurality of sheets P in the form of the sheet bundle B along the center line thereof. The folding process section 22 includes a stacking tray 41, a folding roller pair 42, and a blade 43. The stacking tray 41 is an example of a tray. The stacking tray 41 allows a plurality of sheets P to be stacked on each other to form the sheet bundle B, which is the plurality of stacked sheets P. The sheets P conveyed along the folding process path 25B are stacked in the stacking tray 41. The plurality of sheets P conveyed along the folding process path 25B are stacked in the stacking tray 41 whenever conveyed along the folding process path 25B.

The folding roller pair 42 includes a first roller 42A and a second roller 42B. The folding roller pair 42 is disposed so as to be rotatable with the first roller 42A and the second roller 42B being in contact with each other via the outer circumferences thereof. The folding roller pair 42 is driven by rotational power applied to one of the first roller 42A and the second roller 42B. The folding roller pair 42 is provided at a position where the folding roller pair 42 faces the stacking tray 41. The folding roller pair 42 faces the surface of the stacking tray 41 on which the sheet bundle B is placed. The axis of rotation of each of the first roller 42A and the second roller 42B extends along the folding line along which the sheets P undergo the center folding. The folding roller pair 42 causes the first roller 42A and the second roller 42B to sandwich the folding line along which the sheets P undergoes the center folding to cause the sheets P to be folded. The folding roller pair 42 is an example of a folding mechanism.

The blade 43 is provided at a position where the blade 43 faces the folding roller pair 42 with the stacking tray 41 interposed therebetween. The blade 43 is located at the side opposite from the folding roller pair 42 with respect to the stacking tray 41. The blade 43 is configured to advance and retract with respect to the stacking tray 41. A through hole is formed through the stacking tray 41. When the stacking tray 41 is viewed from the side facing the folding roller pair 42 toward the blade 43, the through hole of the stacking tray 41 overlaps with the blade 43. The position of the blade 43 is switched between a protruding position to which the blade 43 protrudes beyond the stacking tray 41 toward the folding roller pair 42 through the through hole of the stacking tray 41 and a retracted position to which the blade 43 is retracted toward the side opposite from the folding roller pair 42 with respect to the stacking tray 41.

When the folding roller pair 42 is viewed from the side facing the blade 43 toward the folding roller pair 42, the blade 43 overlaps with a nipping portion where the outer circumferences of the first roller 42A and the second roller 42B are in contact with each other. When the blade 43 is displaced from the retracted position to the protruding position, the sheet bundle B is bent by the blade 43. The blade 43 presses the folding line of the bent sheet bundle B against the nipping portion, where the first roller 42A and the second roller 42B are in contact with each other. The folding line of the sheet bundle B is nipped by the nipping portion, where the first roller 42A and the second roller 42B are in contact with each other, with the folding roller pair 42 rotationally driven, so that the sheet bundle B is folded along the center line. The folding process is thus performed on the sheet bundle B.

The plurality of sheets P conveyed along the folding process path 25B are stacked in the stacking tray 41 whenever conveyed along the folding process path 25B, as described above. Therefore, among the plurality of sheets P, which constitute the sheet bundle B, the sheet P first conveyed along the folding process path 25B faces the blade 43 via the through hole of the stacking tray 41. Therefore, when the folding process is performed on the sheet bundle B, the sheet P first conveyed along the folding process path 25B out of the plurality of sheets P, which constitute the sheet bundle B, comes into contact with the blade 43. Among the plurality of sheets P, which constitute the sheet bundle B, the sheet P last conveyed along the folding process path 25B faces the folding roller pair 42. Therefore, when the folding process is performed on the sheet bundle B, the sheet P last conveyed along the folding process path 25B out of the plurality of sheets P, which constitute the sheet bundle B, comes into contact with the folding roller pair 42.

The stapling process section 27 includes one of the conveyance roller pairs 31, a stapling tray 45, and a stapler 46. The conveyance roller pair 31 in the stapling process section 27 is hereinafter also referred to as a conveyance roller pair 31A. The stapling tray 45 allows accumulation of a plurality of sheets P. The stapler 46 staples the plurality of sheets P accumulated in the stapling tray 45. The sheets P are conveyed by the conveyance roller pair 31A to the stapling tray 45.

The discharge process section 28 includes the conveyance roller pairs 31 and a second stacker 48. The conveyance roller pair 31 in the discharge process section 28 is hereinafter also referred to as a conveyance roller pair 31B. The second stacker 48 is a receiver in which the sheet P printed by the printing apparatus 2 is accumulated. The sheets P guided to the discharge process section 28 along the sheet discharging path 25D are discharged by the conveyance roller pair 31B into the second stacker 48. The discharge process section 28 can discharge the sheets P out of the post-processing apparatus 3 from the interior of the post-processing apparatus 3. A user who does not desire post-processing on a sheet P can receive the sheet P from the second stacker 48.

Figure 2:
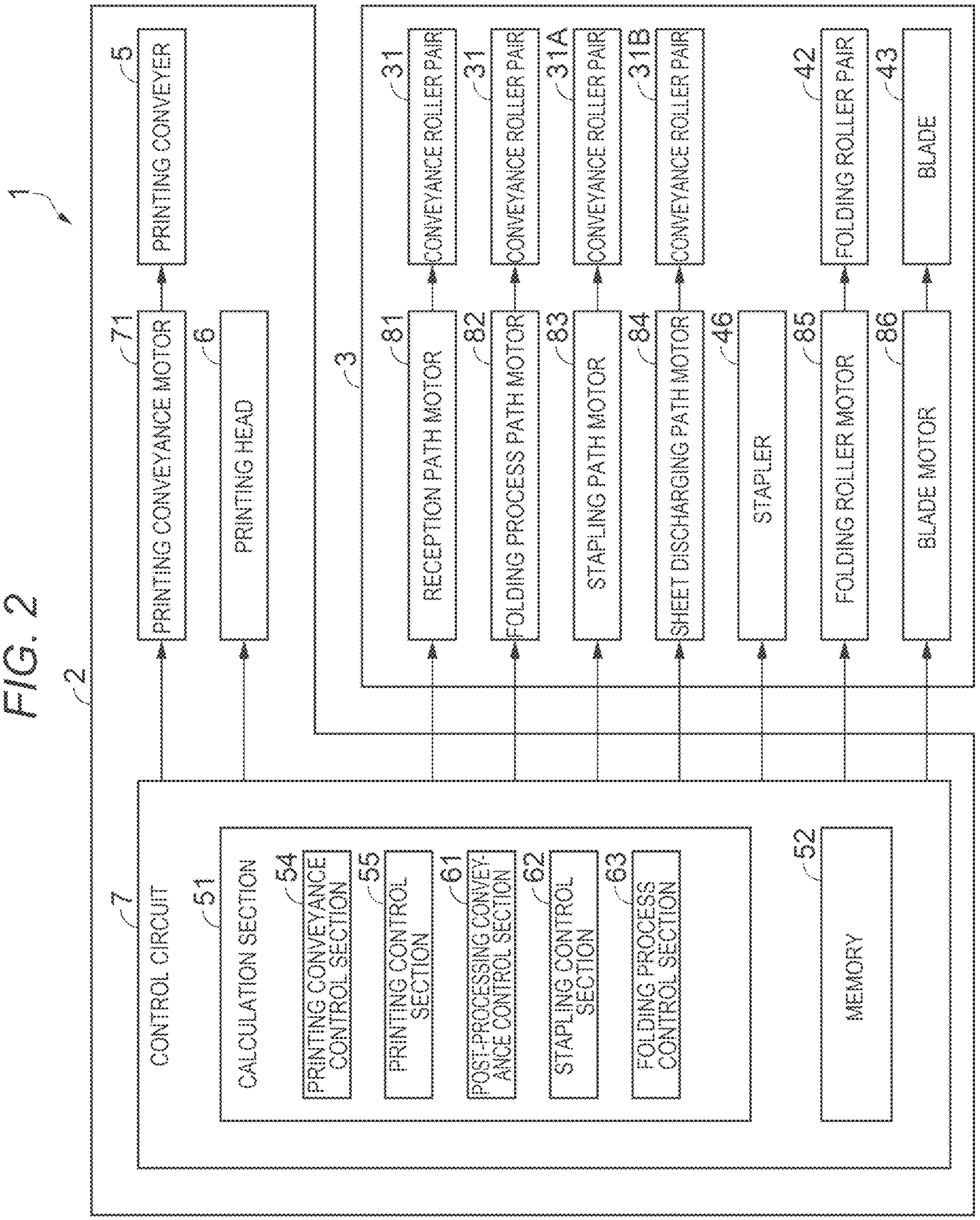
FIG. 2 is a block diagram which shows the configuration of the printing system.

The control circuit 7 includes a calculation section 51 and a memory 52, as shown in FIG. 2. The control circuit 7 is a controller that controls the printing system 1. The calculation section 51 is an example of a control section. The calculation section 51 is by way of example a processor including a CPU (central processing unit) or an MPU (micro processing unit). The control circuit 7 controls the overall operation of the printing system 1 by executing a control program stored in the memory 52. The memory 52 is formed of a RAM (random access memory), a ROM (read only memory), and other memories. The RAM functions as a work area of the calculation section 51. The RAM is used to temporarily store a variety of control programs, a variety of data, and other pieces of information. The ROM stores, for example, the control program for controlling the operation of the printing system 1, and a variety of pieces of setting information.

The calculation section 51 functions as a variety of functional sections by executing the control program stored in the memory 52. The calculation section 51 includes a printing conveyance control section 54, a printing control section 55, a post-processing conveyance control section 61, a stapling control section 62, and a folding process control section 63 as the functional sections. The calculation section 51 functions as the printing conveyance control section 54, the printing control section 55, the post-processing conveyance control section 61, the stapling control section 62, and the folding process control section 63 by executing the control program.

The printing apparatus 2 further includes a printing conveyance motor 71. The printing conveyance motor 71 generates power for driving the plurality of conveyance roller pairs 11 of the printing conveyance portion 5. The post-processing apparatus 3 further includes a reception path motor 81, a folding process path motor 82, a stapling path motor 83, a sheet discharging path motor 84, a folding roller motor 85, and a blade motor 86.

The reception path motor 81 generates power for driving the conveyance roller pair 31 of the reception path 25A, which is a part of the post-processing conveyance path 25. The folding process path motor 82 generates power for driving the conveyance roller pair 31 of the folding process path 25B, which is a part of the post-processing conveyance path 25. The stapling path motor 83 generates power for driving the conveyance roller pair 31A of the stapling path 25C, which is a part of the post-processing conveyance path 25. The sheet discharging path motor 84 generates power for driving the conveyance roller pair 31B of the sheet discharging path 25D, which is a part of the post-processing conveyance path 25. The folding roller motor 85 generates power for driving the folding roller pair 42. The blade motor 86 generates power for driving the blade 43. The power source for driving the blade 43 is not limited to the blade motor 86, and can, for example, be an electromagnetic solenoid.

The printing conveyance control section 54 controls the rotation of the plurality of conveyance roller pairs 11 of the printing conveyance portion 5 by controlling the operation of driving the printing conveyance motor 71. The printing control section 55 controls ejection of the ink from the printing head 6 by controlling the operation of driving the printing head 6. The post-processing conveyance control section 61 individually controls the operation of driving the reception path motor 81, the folding process path motor 82, the stapling path motor 83, and the sheet discharging path motor 84. The post-processing conveyance control section 61 controls the conveyance of the sheets P along each of the reception path 25A, the folding process path 25B, the stapling path 25C, and the sheet discharging path 25D. The stapling control section 62 controls the stapling process on the sheets P by controlling the operation of driving the stapler 46. The folding process control section 63 individually controls the operation of driving the folding roller motor 85 and the blade motor 86. The folding process control section 63 controls the process of folding the sheets P or the sheet bundle B.

In the printing system 1 having the configuration described above, printing on a sheet P is performed based on a print job specified by a user. The print job is a set of data that cause the printing system 1 to perform the printing operation once. The print job is a print instruction instructed by the user. The print job includes print data that instructs characters, images, and the like to be printed on the sheet P. The print job further includes setting data that specify the type and size of the sheet P, the region where the print data is to be printed, and the like. The print job still further includes post-processing data that indicate the content of post-processing to be performed on the sheet P. When the printing system 1 accepts a print job, the calculation section 51 executes the control program based on the print job to perform printing on the sheet P.

When the printing system 1 accepts a print job, the calculation section 51 controls the operation of driving the printing conveyance motor 71 and the printing head 6 based on the print data. The printing conveyance control section 54 controls the printing conveyance motor 71 to cause it to supply a sheet P from the sheet feeding path 9A to the printing process path 9B shown in FIG. 1. The printing control section 55 controls the printing head 6 to cause it to perform the printing on the sheet P conveyed along the printing process path 9B. When the print job contains a double-sided printing instruction, the sheet P is reversed upside down at the sheet reversing path 9C and the sheet drawing-in path 9E and then conveyed to the printing process path 9B. When the print job contains an instruction that instructs the post-processing apparatus 3 not to perform post-processing, the sheet P is discharged from the sheet discharging path 9D to the first stacker 16. On the other hand, when the print job contains an instruction that instructs the post-processing apparatus 3 to perform post-processing, the sheet P is delivered to the post-processing apparatus 3 via the discharge port 12.

The post-processing conveyance control section 61 controls the reception path motor 81 to drive the conveyance roller pair 31 of the reception path 25A. The sheet P delivered from the printing apparatus 2 to the post-processing apparatus 3 is received into the post-processing apparatus 3 via the reception path 25A. When the post-processing data contained in the print job instructs the folding process, the conveyance path of the sheets P is switched from the reception path 25A to the folding process path 25B. The folding process control section 63 controls the folding roller motor 85 and the blade motor 86 to drive the folding roller pair 42 and the blade 43. As a result, the sheets P or the sheet bundle B is folded.

When the post-processing data contained in the print job instructs the stapling process, the conveyance path of the sheets P is switched from the reception path 25A to the stapling path 25C. The post-processing conveyance control section 61 then controls the stapling path motor 83 to drive the conveyance roller pair 31A of the stapling path 25C. The sheets P are placed in the stapling tray 45 from the stapling path 25C by the conveyance roller pair 31A. The stapling control section 62 then controls the operation of driving the stapler 46 to staple the sheets P.

When the post-processing data contained in the print job instructs the discharge process, the conveyance path of the sheets P is switched from the stapling path 25C to the sheet discharging path 25D. The post-processing conveyance control section 61 then controls the sheet discharging path motor 84 to drive the conveyance roller pair 31B of the sheet discharging path 25D. The sheets P are placed in the second stacker 48 from the sheet discharging path 25D by the conveyance roller pair 31B.

When the post-processing data contained in the print job instructs the folding process on the sheet bundle B, the print data for the plurality of sheets P, which constitute the sheet bundle B, are specified by the print job. In the folding process on the sheet bundle B, the arrangement order of the plurality of sheets P in the sheet bundle B is also specified by the print data. That is, in the folding process on the sheet bundle B, the arrangement order of the pages are in the sheet bundle B having undergone the folding process is specified by the print data. The printing system 1 can therefore grasp the arrangement order of the plurality of sheets P in the sheet bundle B based on the print job.

In the folding process continuously performed on a plurality of sheet bundles B, before starting the folding process on a sheet bundle B, the printing system 1 starts the printing operation on the following sheet bundle B. The printing operation starts when the calculation section 51 of the control circuit 7 starts the printing process. That is, when the folding process is continuously performed on a plurality of sheet bundles B, before starting the folding process on a sheet bundle B, the printing system 1 starts the printing process on the following sheet bundle B. The printing operation includes the operation of supplying the printing process path 9B with the sheets P from the sheet feeding path 9A shown in FIG. 1. The printing system 1 therefore starts supplying the printing process path 9B with the sheets P that constitute the following sheet bundle B during the period from the end of the printing process on one sheet bundle B to the start of the folding process on the one sheet bundle B.

The folding process on a plurality of sheet bundles B will be described on the assumption that one sheet bundle B among the plurality of sheet bundles B is a first sheet bundle B1 and the sheet bundle B following the first sheet bundle B1 is a second sheet bundle B2. The case where the folding process is continuously performed on the plurality of sheet bundles B includes a case where the folding process on the plurality of sheet bundles B is instructed by one print job. The case where the folding process is continuously performed on the plurality of sheet bundles B further includes a case where a print job that instructs the folding process on one sheet bundle B is repeated. The plurality of continuous sheet bundles B may differ from one another in terms of the printing content, or may have the same printing content. The first sheet bundle B1 is an example of a first medium bundle. The second sheet bundle B2 is an example of a second medium bundle.

Figure 3:
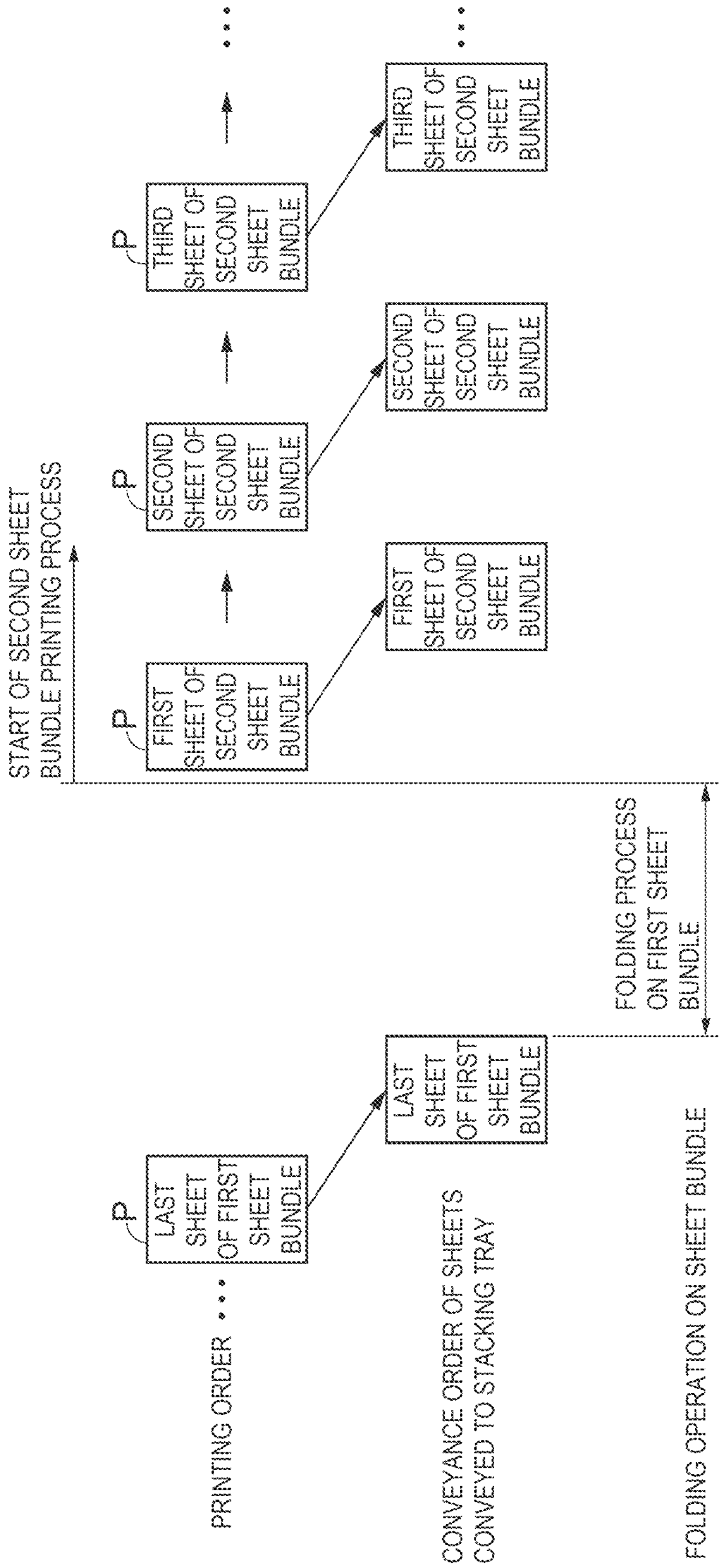
FIG. 3 diagrammatically illustrates the flow of sheets in a folding process performed on a plurality of sheet bundles in Comparative Example.

FIG. 3 diagrammatically illustrates the flow of the sheets P in the folding process performed on a plurality of sheet bundles B in Comparative Example. FIG. 3 shows the printing order of a plurality of sheets P that constitute each of the sheet bundles B and the conveyance order of the plurality of sheets P conveyed to the stacking tray 41. The printing order is indicated by the direction of the arrows from left to right in the front view, or the printing process proceeds along the direction. The sheets P each show the arrangement order of the sheet P in each of the sheet bundles B. FIG. 3 shows the last sheet P out of the plurality of sheets P that constitute the first sheet bundle B1, and the first to third sheets P out of the plurality of sheets P that constitute the second sheet bundle B2 in the arrangement order therein. In Comparative Example shown in FIG. 3, the printing order of the plurality of sheets P, which constitute each of the sheet bundles B, is the same as the arrangement order of the plurality of sheets P in the sheet bundle B. In Comparative Example shown in FIG. 3, the conveyance order of the plurality of sheets P conveyed to the stacking tray 41 is the same as the printing order.

In Comparative Example shown in FIG. 3, the printing process on the second sheet bundle B2 starts after the folding process on the first sheet bundle B1 ends. A situation in which the folding process on the first sheet bundle B1 is hindered by the sheets P in the second sheet bundle B2 can be avoided. In Comparative Example, however, the printing apparatus 2 does not perform the printing operation after the printing process on the first sheet bundle B1 ends but before the folding process on the first sheet bundle B1 ends. In contrast, in the present embodiment, the printing process on the second sheet bundle B2 starts after the printing process on the first sheet bundle B1 ends but before the folding process on the first sheet bundle B1 starts. The time required to continuously perform the folding process on the plurality of sheet bundles B can thus be shortened.

Figure 4:
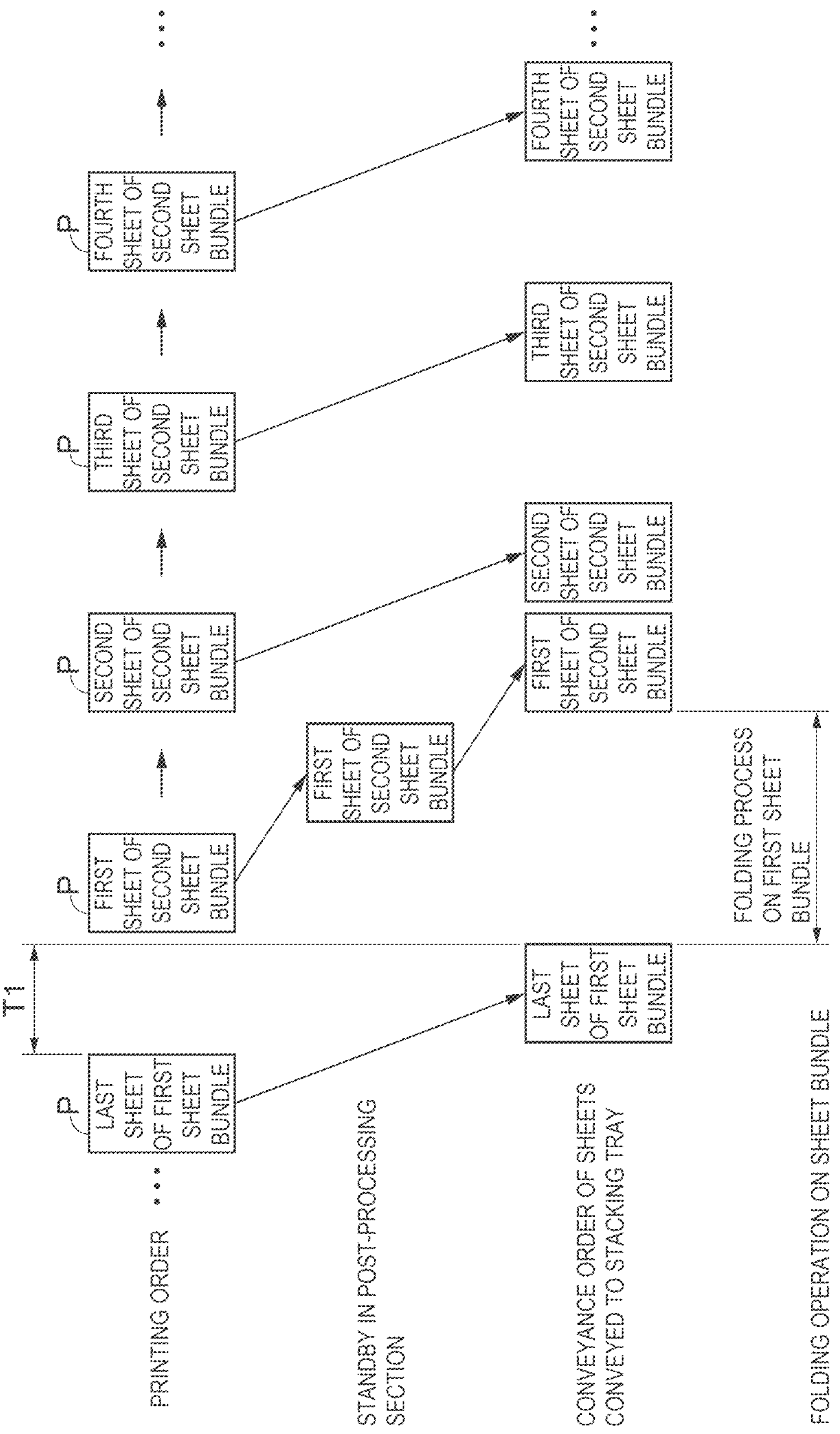
FIG. 4 diagrammatically illustrates the flow of the sheets in the folding process performed on the plurality of sheet bundles in a first embodiment.

FIG. 4 diagrammatically illustrates the flow of the sheets P in the folding process performed on the plurality of sheet bundles B in the first embodiment. In the control method according to the first embodiment, a printing process start period T1 is set, as shown in FIG. 4. The printing process start period T1 is the period from the end of the printing on the last sheet P in the first sheet bundle B1 to the start of the folding process on the first sheet bundle B1. In the first embodiment, the calculation section 51 of the control circuit 7 starts the printing process on the second sheet bundle B2 in the printing process start period T1. The printing on the first sheet P in the second sheet bundle B2 thus proceeds during the period for which the folding process is performed on the first sheet bundle B1. The first sheet P in the second sheet bundle B2 is the first sheet P out of the plurality of sheets P that constitute the second sheet bundle B2 in the arrangement order therein. The first sheet P in the second sheet bundle B2 corresponds to the first medium in the second medium bundle.

Starting the printing process on the second sheet bundle B2 in the printing process start period T1 includes a case where printing performed by the printing head 6 on the first sheet P of the second sheet bundle B2 starts within the printing process start period T1. Starting the printing process on the second sheet bundle B2 in the printing process start period T1 also includes a case where printing performed by the printing head 6 on the first sheet P of the second sheet bundle B2 starts after the printing process start period T1. The calculation section 51 of the control circuit 7 only needs to output an instruction that starts the printing process on the second sheet bundle B2 within the printing process start period T1.

After the printing on the first sheet P in the second sheet bundle B2 ends, the first sheet P is put on standby in the post-processing section 23 until the folding process on the first sheet bundle B1 ends. After the folding process on the first sheet bundle B1 ends, the first sheet P in the second sheet bundle B2 is accumulated in the stacking tray 41. After the printing on the first sheet P in the second sheet bundle B2 ends, but before the first sheet P is conveyed to the stacking tray 41, the printing on the second sheet P in the second sheet bundle B2 proceeds. After the printing on the second sheet P in the second sheet bundle B2 ends, the second sheet P is accumulated in the stacking tray 41. Thereafter, the printing process continues until the printing on all the sheets P that constitute the second sheet bundle B2 and the conveyance of the printed sheets P to the stacking tray 41 end. When a third sheet bundle B3 follows the second sheet bundle B2, the same procedure described above is also applied to the third sheet bundle B3.

According to the printing system 1 and the method for controlling the printing system 1, the calculation section 51 of the control circuit 7 causes the printing apparatus 2 to start the printing process on the first sheet P of the second sheet bundle B2 in the printing process start period T1. The printing process on the second sheet bundle B2 can thus start after the printing on the first sheet bundle B1 ends but before the folding process on the first sheet bundle B1 starts. As a result, the time required for the folding process on the plurality of sheet bundles B can be shortened. The calculation section 51 of the control circuit 7 causes the printed first sheet P to stand by in the post-processing section 23 until the folding process on the first sheet bundle B1 ends. The situation in which the first sheet P of the second sheet bundle B2 hinders the folding process on the first sheet bundle B1 can thus be avoided.

The procedure of the folding process performed on a plurality of sheet bundles B will be described. Based on the print job, the printing conveyance control section 54 and the printing control section 55 shown in FIG. 2 control the printing conveyance motor 71 and the printing head 6 to perform printing on the plurality of sheets P that constitute the first sheet bundle B1. At this point in time, the printing conveyance control section 54 controls the printing conveyance motor 71 to convey the printed sheets P to the post-processing apparatus 3 whenever each of the sheets P is printed. After the printing on the last sheet P of the first sheet bundle B1 ends but within the printing process start period T1, the calculation section 51 of the control circuit 7 instructs the printing conveyance control section 54 and the printing control section 55 to start the printing process on the second sheet bundle B2.

In parallel with the printing process on the second sheet bundle B2, the post-processing conveyance control section 61 controls the reception path motor 81 to drive the conveyance roller pair 31 of the reception path 25A. The sheet P delivered from the printing apparatus 2 to the post-processing apparatus 3 is received into the post-processing apparatus 3 via the reception path 25A. At this point in time, the path along which the sheets P are conveyed changes from the reception path 25A to the folding process path 25B. The plurality of sheets P that constitute the first sheet bundle B1 are accumulated in the stacking tray 41 in the printed order of the sheets P. When the last sheet P of the first sheet bundle B1 is accumulated in the stacking tray 41, the folding process control section 63 drives the folding roller pair 42 and the blade 43. The folding roller pair 42 and the blade 43 are driven when the folding process control section 63 controls the folding roller motor 85 and the blade motor 86. As a result, the folding process is performed on the first sheet bundle B1.

After the printing on the first sheet P of the second sheet bundle B2 ends in parallel with the folding process on the first sheet bundle B1, the printing conveyance control section 54 causes the first sheet P of the second sheet bundle B2 to be conveyed to the post-processing apparatus 3. The first sheet P of the second sheet bundle B2 is conveyed by the printing conveyance portion 5 from the printing apparatus 2 to the post-processing apparatus 3. The printing conveyance portion 5 is driven when the printing conveyance control section 54 controls the printing conveyance motor 71.

The post-processing conveyance control section 61 controls the reception path motor 81 to cause the post-processing conveyance portion 21 to take the first sheet P of the second sheet bundle B2 into the post-processing apparatus 3 via the reception port 32. At this point in time, the path along which the sheet P is conveyed is switched from the reception path 25A to the stapling path 25C. The post-processing conveyance control section 61 then controls the stapling path motor 83 to stop driving the conveyance roller pair 31A of the stapling path 25C. The first sheet P of the second sheet bundle B2 thus stays in the stapling path 25C with the first sheet P nipped by the conveyance roller pair 31A. That is, the post-processing conveyance control section 61 causes the first sheet P of the second sheet bundle B2 to stand by in the stapling process section 27.

During the standby period, the printing conveyance control section 54 controls the printing conveyance motor 71 to cause the second sheet P of the second sheet bundle B2 to be supplied from the sheet feeding path 9A to the printing process path 9B. The printing control section 55 then controls the printing head 6 to cause the printing head 6 to perform printing on the second sheet P of the second sheet bundle B2. Thereafter, based on the completion of the folding process on the first sheet bundle B1, the post-processing conveyance control section 61 controls the stapling path motor 83 to drive the conveyance roller pair 31A of the stapling path 25C in the reverse direction. The first sheet P of the second sheet bundle B2 having been on standby in the stapling process section 27 is reversely fed from the stapling path 25C to the reception path 25A.

The post-processing conveyance control section 61 then controls the reception path motor 81 to cause the first sheet P of the second sheet bundle B2 to travel back to the reception path 25A. The path along which the sheet P is conveyed is then switched from the reception path 25A to the folding process path 25B. The post-processing conveyance control section 61 then controls the folding process path motor 82 to drive the conveyance roller pair 31 of the folding process path 25B. The first sheet P of the second sheet bundle B2 is thus placed in the stacking tray 41. That is, after the folding process on the first sheet bundle B1 ends, the post-processing conveyance control section 61 causes the post-processing conveyance portion 21 to convey the first sheet P of the second sheet bundle B2 from the post-processing section 23 toward the stacking tray 41. The situation in which the first sheet P of the second sheet bundle B2 hinders the folding process on the first sheet bundle B1 can thus be avoided.

During the period described above, after the printing on the second sheet P of the second sheet bundle B2 ends, the printing conveyance control section 54 controls the printing conveyance motor 71 to cause the printing conveyance portion 5 to convey the second sheet P to the post-processing apparatus 3. The post-processing conveyance control section 61 then controls the reception path motor 81 to cause the post-processing conveyance portion 21 to take the second sheet P of the second sheet bundle B2 into the post-processing apparatus 3 via the reception port 32. At this point in time, the path along which the sheets P are conveyed changes from the reception path 25A to the folding process path 25B. The second sheet P of the second sheet bundle B2 is accumulated in the stacking tray 41.

Thereafter, printing is performed on the remaining sheets P of the second sheet bundle B2, and the printed sheets P are conveyed to the stacking tray 41. After completion of the printing on the plurality of sheets P, which constitute the second sheet bundle B2, and accumulation of the printed sheets P in the stacking tray 41, the folding process control section 63 controls the folding roller motor 85 and the blade motor 86. The folding roller pair 42 and the blade 43 are driven under the control of the folding process control section 63. The folding process is thus performed on the second sheet bundle B2.

Figure 5:
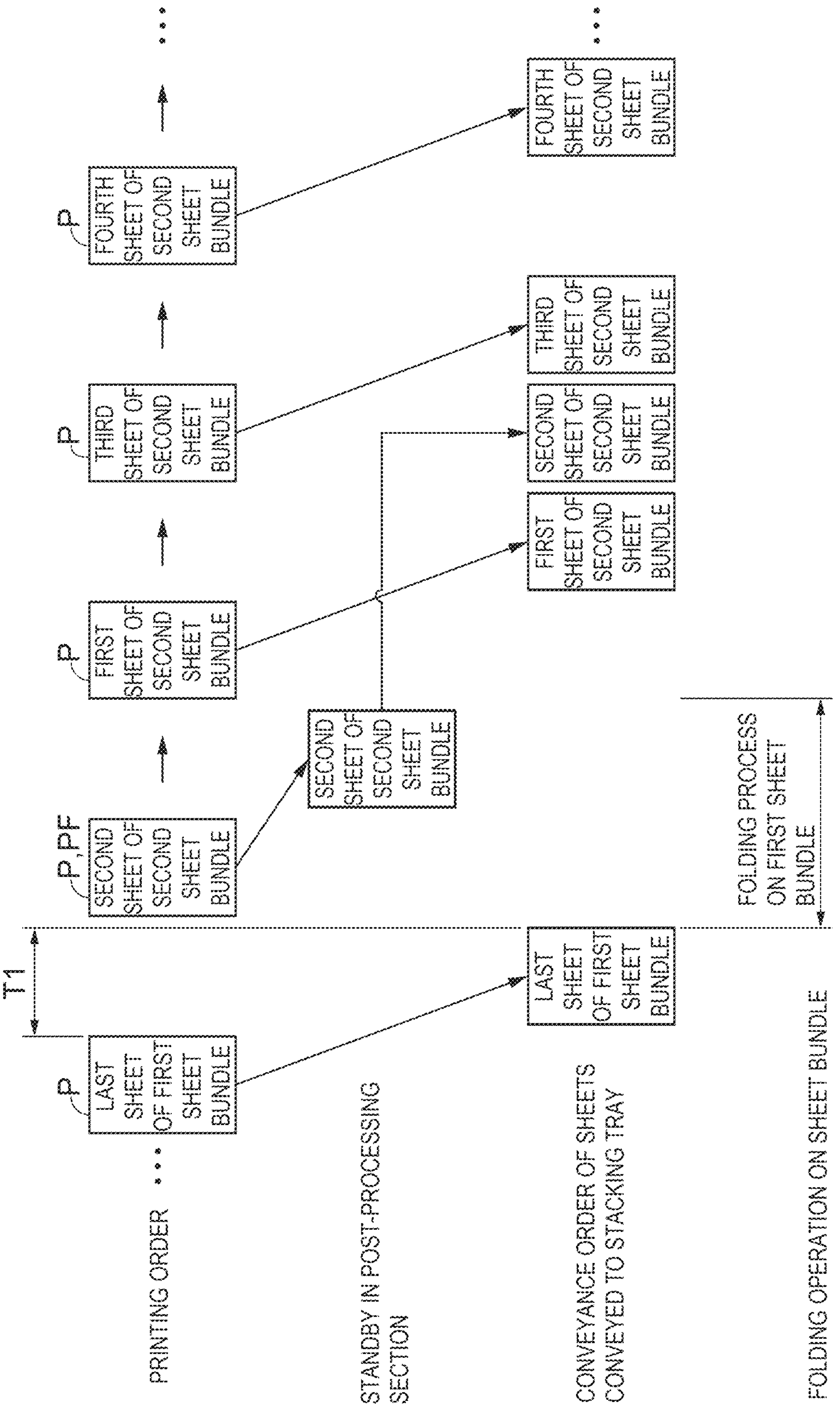
FIG. 5 diagrammatically illustrates the flow of the sheets in the folding process performed on the plurality of sheet bundles in a second embodiment.

In the first embodiment shown in FIG. 4, the sheet P to be printed first out of the plurality of sheets P that constitute the second sheet bundle B2 is the first sheet P of the second sheet bundle B2 in the arrangement order therein. The sheet P to be printed first out of the plurality of sheets P of the second sheet bundle B2, however, is not limited to the first sheet P of the second sheet bundle B2 in the arrangement order therein. The sheet P to be printed first out of the plurality of sheets P of the second sheet bundle B2 can be the second sheet P or any of the third and subsequent sheets P of the second sheet bundle B2 in the arrangement order therein. For example, the second sheet P of the second sheet bundle B2 in the arrangement order therein can be the sheet P to be printed first, as shown in FIG. 5. In a second embodiment shown in FIG. 5, the second sheet P of the second sheet bundle B2 in the arrangement order therein corresponds to the first medium in the second medium bundle.

In the control method according to the second embodiment, the printing order of the second sheet P of the second sheet bundle B2 in the arrangement order therein is advanced to a position earlier than the arrangement order of the second sheet P in the second sheet bundle B2. In the second embodiment, the printing order of the second sheet P of the second sheet bundle B2 in the arrangement order therein is advanced to the first position. The range of positions to which the printing order can be advanced varies in accordance with the number of sheets P that constitute the sheet bundle B and the arrangement order of the sheet P to be advanced. For example, when the sheet bundle B is formed of two sheets P, the number of positions to which the second sheet P in the arrangement order is advanced is one. When the sheet bundle B is formed of three sheets P, the number of positions to which a sheet P is advanced is one or two. The range of positions to which the printing order can be advanced thus varies in accordance with the number of sheets P that constitute the sheet bundle B and the arrangement order of the sheet P to be advanced. The number of positions to which the printing order is advanced can be any number within the range of positions to which the printing order can be advanced.

The sheet P of a sheet bundle B that has a printing order to be advanced to a position earlier than the arrangement order of the sheet P is called an advanced sheet PF. In the second embodiment shown in FIG. 5, the second sheet P of the second sheet bundle B2 in the arrangement order therein is the advanced sheet PF. In the second embodiment, since the second sheet P of the second sheet bundle B2 in the arrangement order therein is the advanced sheet PF, the printing order of the second sheet P is advanced from the second position in the arrangement order to the first position. The second sheet P advanced to the first position in the printing order is caused to stand by, after printed, in the post-processing section 23. While the second sheet P stands by in the post-processing section 23, printing is performed on the first sheet P of the second sheet bundle B2 in the arrangement order therein. The first sheet P on which the printing has been performed is accumulated in the stacking tray 41.

Printing is then performed on the third sheet P of the second sheet bundle B2 in the arrangement order therein. At this point in time, in parallel with the printing performed on the third sheet P, the second sheet P having been on standby in the post-processing section 23 is accumulated in the stacking tray 41. The third sheet P on which the printing has been performed is then accumulated in the stacking tray 41. In the second embodiment, the control circuit 7 advances the printing order of the advanced sheet PF, which is the second sheet P of the second sheet bundle B2 in the arrangement order therein, to the first position from the arrangement order of the second sheet P and causes the printing head 6 to perform the printing on the first sheet P. The control circuit 7 controls the post-processing conveyance portion 21 of the post-processing apparatus 3 to cause the advanced sheet PF to stand by in the post-processing section 23 and then cause the post-processing conveyance portion 21 to convey the advanced sheet PF to the stacking tray 41 in the arrangement order in the second sheet bundle B2. The second embodiment also provides the same effects as those provided by the first embodiment.

The second embodiment is preferable, for example, when the plurality of sheets P that constitute the second sheet bundle B2 contains a sheet P to which an amount of ink ejected from the printing head 6 greater than a predetermined amount is ejected. In this case, the sheet P to which an amount of ink ejected from the printing head 6 greater than the predetermined amount is ejected is set as the advanced sheet PF, and the printing order of the advanced sheet PF is advanced to the first position. The printed advanced sheet PF stands by for the period until the process of folding the first sheet bundle B1 ends and the period for which the printing is performed on the first sheet P of the second sheet bundle B2 in the arrangement order therein.

That is, in the second embodiment, the period for which the first sheet P stands by is longer than that in the first embodiment. The standby period can be used to dry the ink attached to the sheet P. Therefore, in the second sheet bundle B2, a situation in which the ink attached to the sheet P to which an amount of ink ejected from the printing head 6 greater than the predetermined amount is ejected is transferred to the adjacent sheet P can be avoided. Furthermore, the period for which the advanced sheet PF is put on standby can be used as the period required for the ink to dry, so that a situation in which the period required to fold the sheet bundle B prolongs is likely to be avoided. The printing system 1 can grasp the amount of ink ejected onto the sheet P based on the print data.

In the second embodiment described above, the number of positions to which the printing order of the advanced sheet PF is advanced may be determined in accordance with the amount of ink to be ejected from the printing head 6. For example, it is preferable to employ a method for advancing the printing order of the advanced sheet PF in accordance with the amount of ink ejected from the printing head 6 to the sheet P. According to the method described above, the period for which the advanced sheet PF stands by can be prolonged in accordance with the amount of ink ejected to the sheet P.

In the second embodiment shown in FIG. 5, the second sheet P of the sheet bundle B in the arrangement order therein is the advanced sheet PF. The advanced sheet PF is, however, not limited to the second sheet P of the sheet bundle B in the arrangement order therein. The third sheet P or any of the fourth and subsequent sheets P of the sheet bundle B in the arrangement order therein may be set as the advanced sheet PF. The above description has been made with reference to the case where the advanced sheet PF is put on standby in the stapling process section 27. The location where the advanced sheet PF is put on standby is, however, not limited to the stapling process section 27. The discharge process section 28 can instead be the location where the advanced sheet PF is put on standby.

Figure 6:
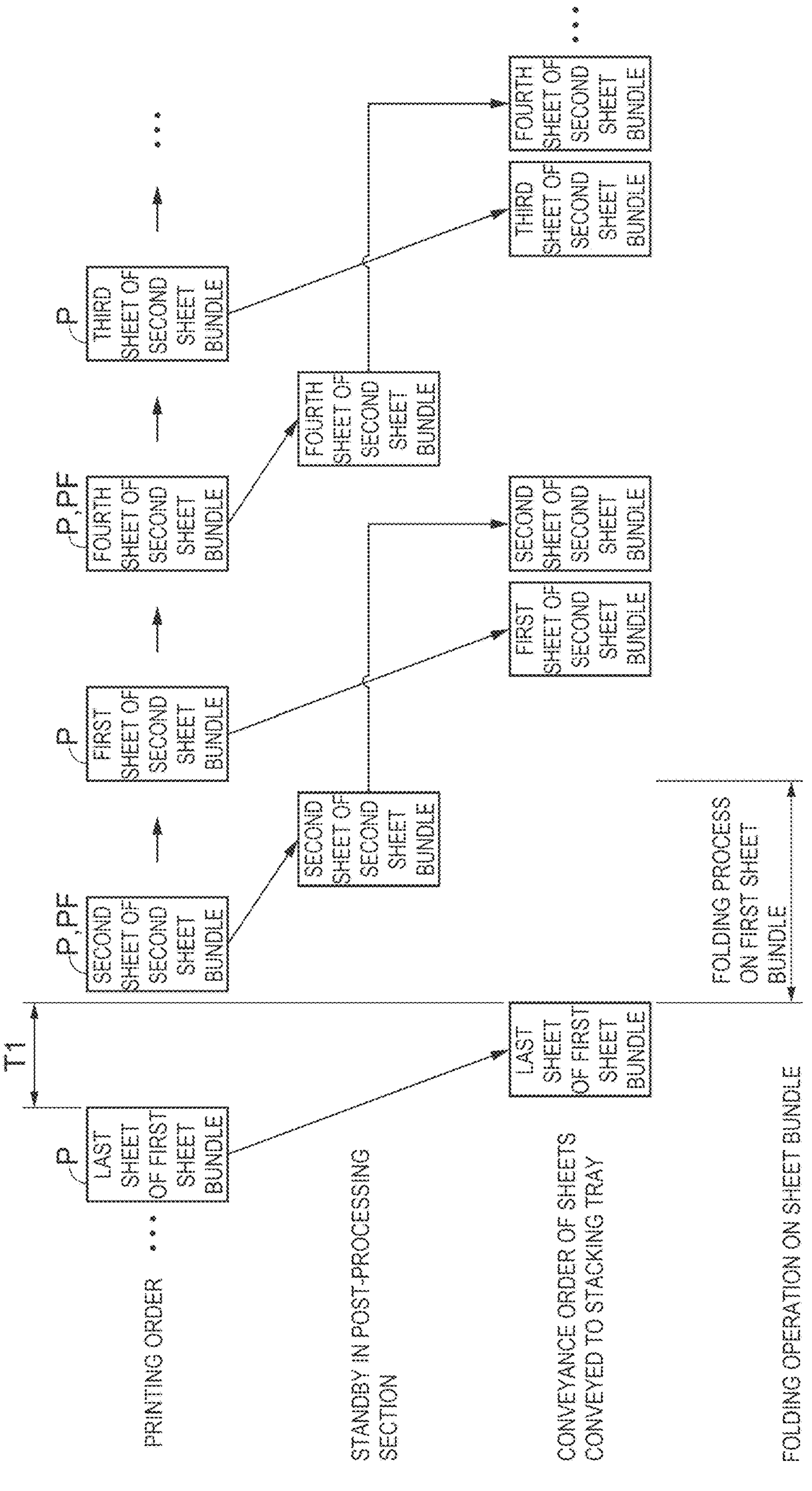
FIG. 6 diagrammatically illustrates the flow of the sheets in the folding process performed on the plurality of sheet bundles in a third embodiment.

Furthermore, the advanced sheet PF is not limited to a single sheet P. For example, two sheets P may each be set as the advanced sheet PF, as shown in FIG. 6. In the control method according to a third embodiment shown in FIG. 6, the second and fourth sheets P of the second sheet bundle B2 in the arrangement order therein are each the advanced sheet PF. The printing order of the second sheet P of the second sheet bundle B2 in the arrangement order therein is advanced to the first position. The printing order of the fourth sheet P of the second sheet bundle B2 in the arrangement order therein is advanced to the third position. The third embodiment is also applicable to a case where the fourth sheet P of the second sheet bundle B2 in the arrangement order therein is advanced to the second position in the printing order. The third embodiment also provides the same effects as those provided by the first and second embodiments.

Figure 7:
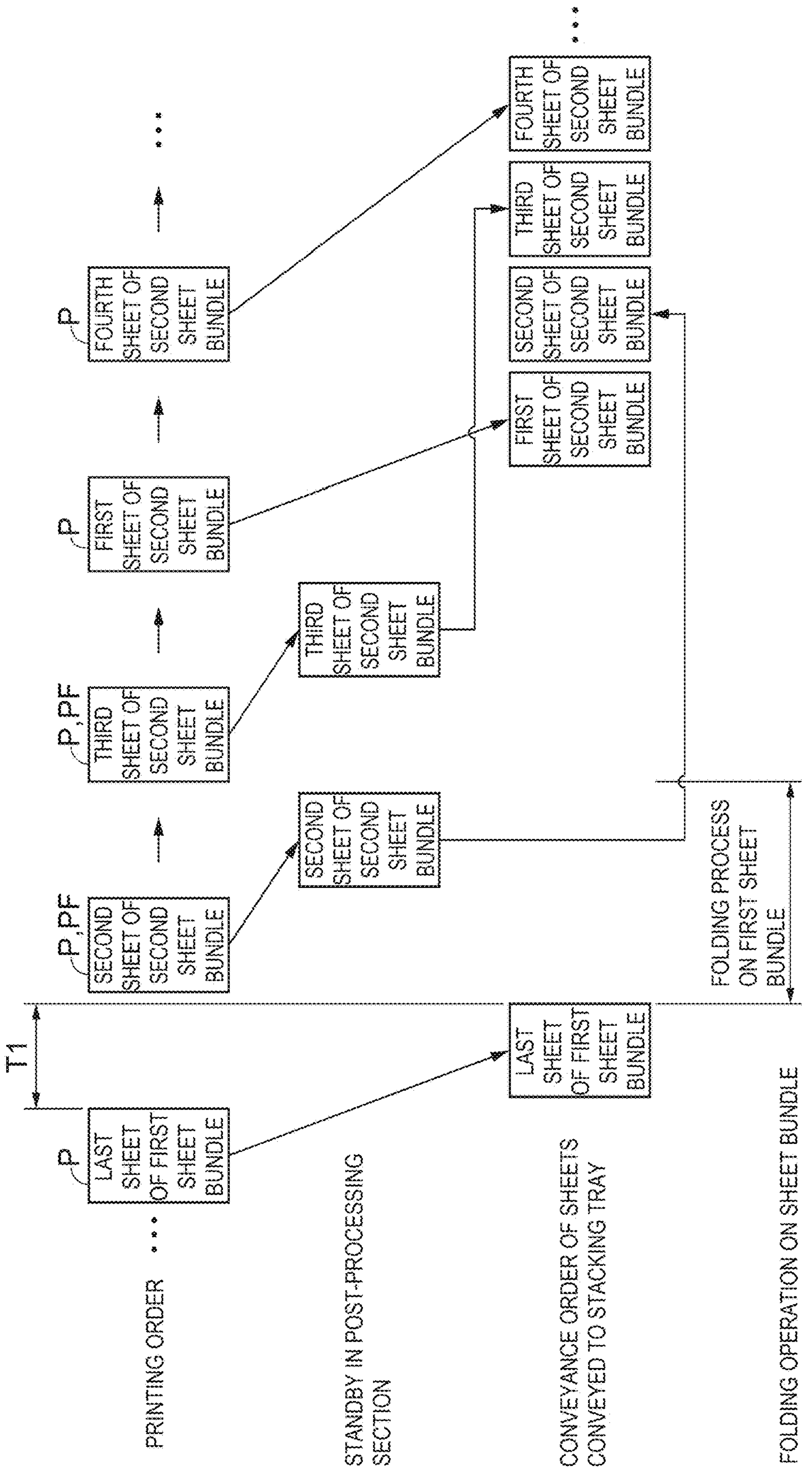
FIG. 7 diagrammatically illustrates the flow of the sheets in the folding process performed on the plurality of sheet bundles in a fourth embodiment.

Furthermore, for example, to a case where the second and third sheets P of the second sheet bundle B2 in the arrangement order therein are each set as the advanced sheet PF, as shown in FIG. 7. In the control method according to a fourth embodiment shown in FIG. 7, the second sheet P of the second sheet bundle B2 in the arrangement order therein is advanced to the first position in the printing order. The third sheet P of the second sheet bundle B2 in the arrangement order therein is advanced to the second position in the printing order. The fourth embodiment also provides the same effects as those provided by the third embodiment. In the fourth embodiment, the second sheet P may be put on standby in the stapling process section 27, and the third sheet P may be put on standby in the discharge process section 28.

In the present embodiment, when the folding process is performed on a sheet bundle B, the printing order of the plurality of sheets P in the sheet bundle B may differ from the arrangement order of the plurality of sheets P in the sheet bundle B. Specifically, when the plurality of sheets P, which constitute the sheet bundle B, includes a sheet P to which an amount of ink ejected from the printing head 6 greater than a predetermined amount is ejected, the printing order of the plurality of sheets P in the sheet bundle B differs from the arrangement order of the plurality of sheets P. The printing system 1 can grasp the amount of ink ejected onto a sheet P based on the print data.

The sheet P to which an amount of ink ejected from the printing head 6 greater than a predetermined amount is ejected is called an ink excess sheet PL. For example, the ink excess sheet PL is set as the advanced sheet PF, and the printing order of the advanced sheet PF is advanced to a position earlier than the arrangement order of the ink excess sheet PL in the sheet bundle B. Furthermore, the sheet P positioned by at least two positions behind the excess ink sheet PL in the printing order can be set as the advanced sheet PF.

Figure 8:
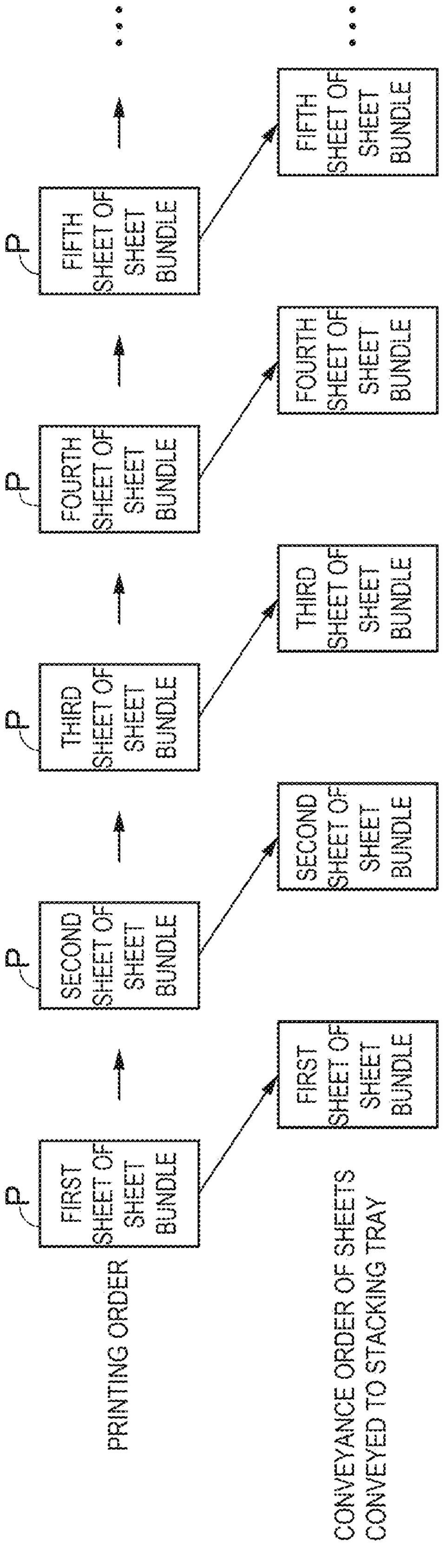
FIG. 8 diagrammatically illustrates the flow of a plurality of sheet that constitute a sheet bundle in the first embodiment.

FIG. 8 diagrammatically illustrates the flow of a plurality of sheet P that constitute a sheet bundle B in the first embodiment. FIG. 8 shows the flow employed when the sheet bundle B on which the folding process is performed does not include the excess ink sheet PL. FIG. 8 shows the printing order of a plurality of sheets P that constitute the sheet bundle B and the conveyance order of the plurality of sheets P conveyed to the stacking tray 41. The printing order is indicated by the direction of the arrows from left to right in the front view, or the printing process proceeds along the direction. The sheets P each show the arrangement order of the sheet P in each of the sheet bundles B. In the first embodiment shown in FIG. 8, the printing order of the plurality of sheets P, which constitute the sheet bundle B, is the same as the arrangement order of the plurality of sheets P in the sheet bundle B. In the first embodiment shown in FIG. 8, the conveyance order of the plurality of sheets P conveyed to the stacking tray 41 is the same as the printing order. When the folding process is performed on the sheet bundle B containing no excess ink sheet PL, the plurality of sheets P, which constitute the sheet bundle B, are accumulated in the stacking tray 41 in the printing order, as shown in FIG. 8. That is, in the first embodiment shown in FIG. 8, the plurality of sheets P, which constitute the sheet bundle B, are printed in the arrangement order of the plurality of sheets P in the sheet bundle B and are accumulated in the stacking tray 41 in the arrangement order of the plurality of sheets P in the sheet bundle B.

Figure 9:
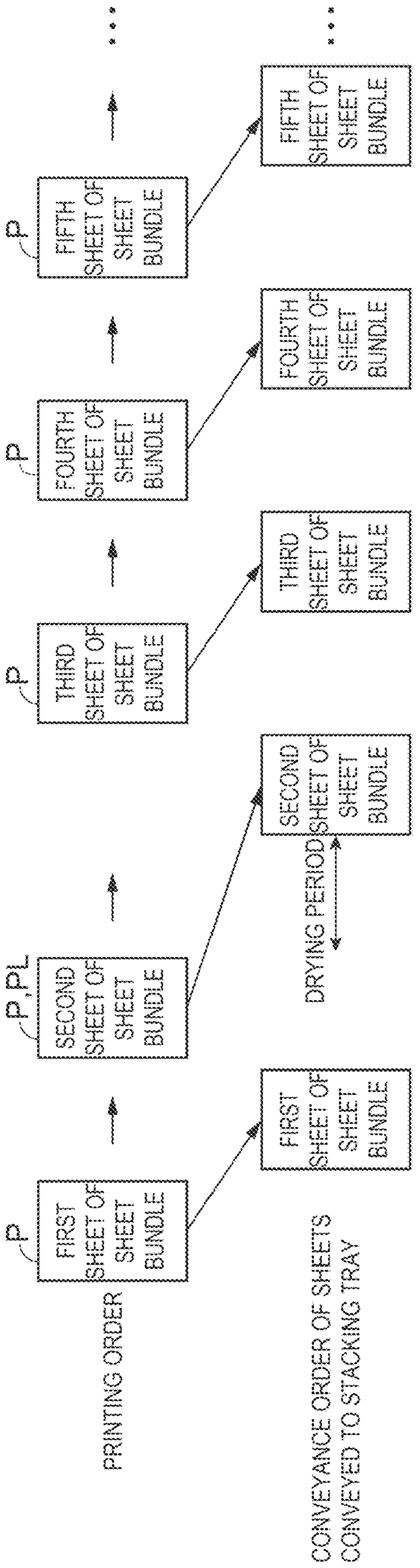
FIG. 9 diagrammatically illustrates the flow of a plurality of sheet in Comparative Example.

When the first embodiment shown in FIG. 8 is applied to the sheet bundle B containing the excess ink sheet PL, it is conceivable that the ink attached to the excess ink sheet PL is transferred to the adjacent sheet P when the plurality of sheets P are accumulated in the stacking tray 41. In this regard, it is conceivable to employ a method for conveying the excess ink sheet PL to the stacking tray 41 after taking time for which the ink on the excess ink sheet PL dries, as shown in FIG. 9 showing Comparative Example. In Comparative Example shown in FIG. 9, the second sheet P of the sheet bundle B in the arrangement order therein is the ink excess sheet PL. Applying the drying period as described above undesirably prolongs the period required for the process of folding the sheet bundle B.

To shorten the prolonged period, the printing order of the advanced sheet PF is advanced to a position earlier than the arrangement order of the advanced sheet PF in the sheet bundle B in the present embodiment. Note that the range of the numbers to which the printing order can be advanced varies in accordance with the number of sheets P that constitute the sheet bundle B. For example, when the sheet bundle B is formed of two sheets P, the number of positions to which the printing order is advanced is one. When the sheet bundle B is formed of three sheets P, the number of positions to which a sheet P is advanced is one or two. The range of the numbers to which the printing order can be advanced thus varies in accordance with the number of sheets P that constitute the sheet bundle B. The number of positions to which the printing order is advanced can be any number within the range of positions to which the printing order can be advanced.

Figure 10:
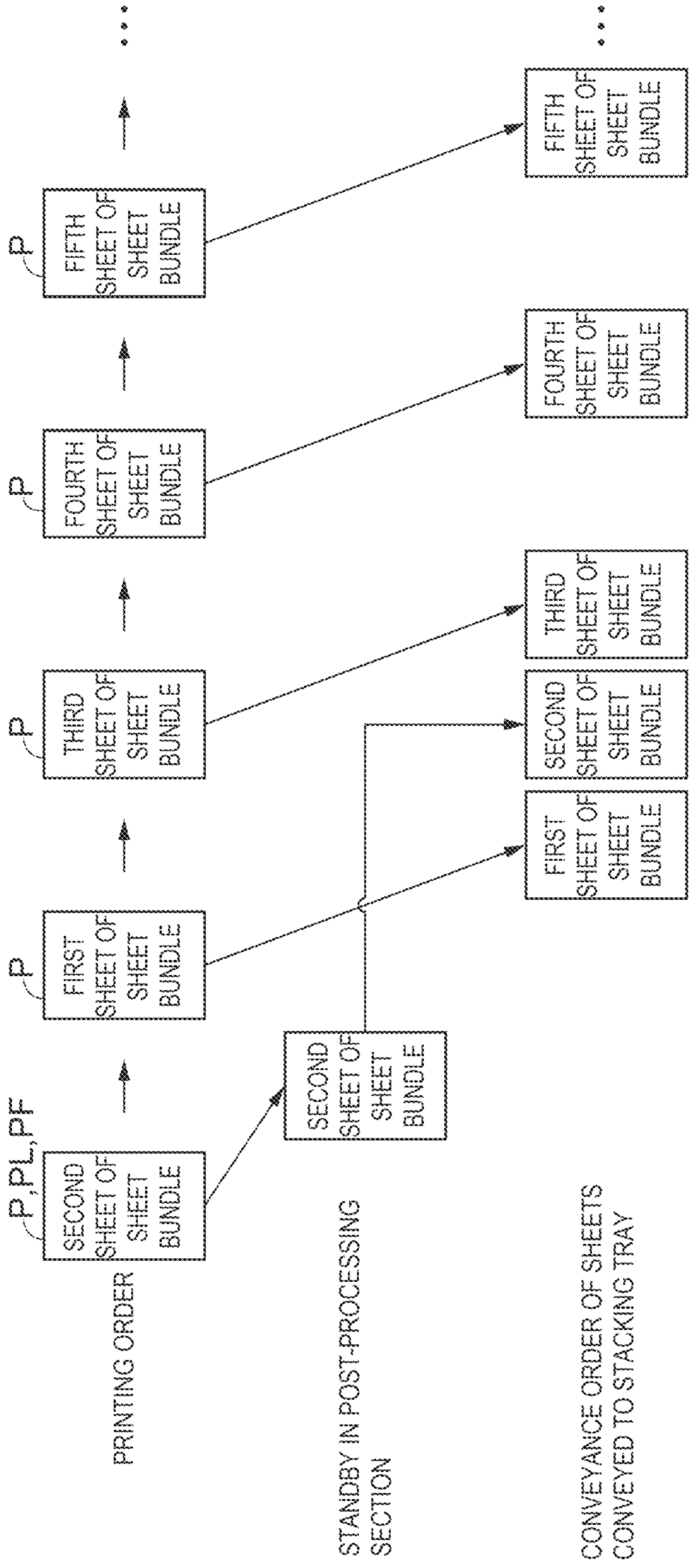
FIG. 10 diagrammatically illustrates the flow of a plurality of sheet that constitute a sheet bundle in the second embodiment.

An example in which the excess ink sheet PL is set as the advanced sheet PF will be described. In this example, the ink excess sheet PL is set as the advanced sheet PF, and the printing order of the advanced sheet PF is advanced to a position earlier than the arrangement order of the ink excess sheet PL in the sheet bundle B. For example, the case where the second sheet P of the sheet bundle B in the arrangement order therein is the ink excess sheet PL, as shown in FIG. 10, will be described. The second sheet P of the sheet bundle B is set as the advanced sheet PF. In this example, since the second sheet P of the sheet bundle B is the advanced sheet PF, the printing order of the second sheet P is advanced from the second position in the arrangement order to the first position.

The second sheet P advanced to the first position in the printing order is caused to stand by, after printed, in the post-processing section 23. While the second sheet P stands by in the post-processing section 23, printing is performed on the first sheet P of the sheet bundle B in the arrangement order therein. The first sheet P on which the printing has been performed is accumulated in the stacking tray 41. Printing is then performed on the third sheet P of the sheet bundle B in the arrangement order therein. At this point in time, the second sheet P having been on standby in the post-processing section 23 is accumulated in the stacking tray 41. The third sheet P on which the printing has been performed is then accumulated in the stacking tray 41.

That is, in the printing system 1, the control circuit 7 advances the printing order of the advanced sheet PF, which is the ink excess sheet PL, to a position earlier than the arrangement order of the advanced sheet PF in the sheet bundle B, and performs printing on the advanced sheet PF. The control circuit 7 controls the post-processing conveyance portion 21 of the post-processing apparatus 3 shown in FIG. 1 to cause the advanced sheet PF to stand by in the post-processing section 23 and then cause the post-processing conveyance portion 21 to convey the advanced sheet PF to the stacking tray 41 in the arrangement order in the sheet bundle B. Drying the ink attached to the sheet P can thus be facilitated as compared with the case where the printing order of the sheet P to which an amount of ink greater than the predetermined amount is ejected is the arrangement order in the sheet bundle B. The situation in which the ink is transferred to the adjacent sheet P is thus likely to be avoided when the plurality of sheets P are stacked on each other. Furthermore, in the printing system 1, the advanced sheet PF is conveyed to the stacking tray 41 while printing is performed on the sheet P next to the advanced sheet PF in the arrangement order in the sheet bundle B. As a result, an increase in the period required for the process of folding the sheet bundle B is likely to be avoided.

How the processes are carried out when a sheet bundle B contains the advanced sheet PF will be described. Based on the print job, the printing conveyance control section 54 controls the printing conveyance motor 71 to cause it to supply the sheet P from the sheet feeding path 9A to the printing process path 9B shown in FIG. 1. The printing control section 55 controls the printing head 6 to cause the printing head 6 to perform printing on the advanced sheet PF. After the printing on the advanced sheet PF ends, the printing conveyance control section 54 controls the printing conveyance motor 71 to cause the printing conveyance portion 5 to convey the advanced sheet PF to the post-processing apparatus 3.

The post-processing conveyance control section 61 controls the reception path motor 81 to cause the post-processing conveyance portion 21 to take the advanced sheet PF into the post-processing apparatus 3 via the reception port 32. At this point in time, the path along which the sheet P is conveyed is switched from the reception path 25A to the stapling path 25C. The post-processing conveyance control section 61 then controls the stapling path motor 83 to stop driving the conveyance roller pair 31A of the stapling path 25C. The advanced sheet PF thus stays in the stapling path 25C with the advanced sheet PF nipped by the conveyance roller pair 31A. That is, the post-processing conveyance control section 61 puts the advanced sheet PF on standby in the stapling process section 27.

During the standby period, the printing conveyance control section controls the printing conveyance motor 71 to cause it to supply the first sheet P of the sheet bundle B in the arrangement order therein from the sheet feeding path 9A to the printing process path 9B. The printing control section 55 then controls the printing head 6 to cause the printing head 6 to perform the printing on the first sheet P of the sheet bundle B in the arrangement order therein. After the printing performed on the first sheet P of the sheet bundle B in the arrangement order therein ends, the printing conveyance control section 54 controls the printing conveyance motor 71 to cause the printing conveyance portion 5 to convey the first sheet P to the post-processing apparatus 3.

The post-processing conveyance control section 61 controls the reception path motor 81 to cause the post-processing conveyance portion 21 to take the first sheet P of the sheet bundle B in the arrangement order therein into the post-processing apparatus 3 via the reception port 32. At this point in time, the path along which the sheet P is conveyed is switched from the reception path 25A to the folding process path 25B. The post-processing conveyance control section 61 then controls the folding process path motor 82 to drive the conveyance roller pair 31 of the folding process path 25B. The first sheet P of the sheet bundle B in the arrangement order therein is thus placed in the stacking tray 41.

During the standby period, the printing conveyance control section 54 controls the printing conveyance motor 71 to cause it to supply the third sheet P of the sheet bundle B in the arrangement order therein from the sheet feeding path 9A to the printing process path 9B. The printing control section 55 then controls the printing head 6 to cause the printing head 6 to perform the printing on the third sheet P of the sheet bundle B in the arrangement order therein. Before the printing on the third sheet P ends, the post-processing conveyance control section 61 causes the advanced sheet PF on standby in the stapling process section 27 to be conveyed toward the stacking tray 41.

The post-processing conveyance control section 61 controls the stapling path motor 83 to drive the conveyance roller pair 31A of the stapling path 25C in the reverse direction. The advanced sheet PF having been on standby in the stapling process section 27 is reversely fed from the stapling path 25C to the reception path 25A. The post-processing conveyance control section 61 then controls the reception path motor 81 to cause the advanced sheet PF to travel back to the reception path 25A. The path along which the sheet P is conveyed is then switched from the reception path 25A to the folding process path 25B. The post-processing conveyance control section 61 then controls the folding process path motor 82 to drive the conveyance roller pair 31 of the folding process path 25B. The advanced sheet PF is thus placed in the stacking tray 41.

After the printing performed on the third sheet P of the sheet bundle B in the arrangement order therein ends, the printing conveyance control section 54 controls the printing conveyance motor 71 to cause the printing conveyance portion 5 to convey the third sheet P to the post-processing apparatus 3. The post-processing conveyance control section 61 then controls the post-processing conveyance portion 21 to accumulate the third sheet P of the sheet bundle B in the arrangement order therein in the stacking tray 41. Thereafter, printing is performed on the sheets P of the sheet bundle B in the arrangement order therein, and the printed sheets P are conveyed to the stacking tray 41. After completion of the printing on the plurality of sheets P, which constitute the sheet bundle B, and accumulation of the printed sheets P in the stacking tray 41, the folding process control section 63 controls the folding roller motor 85 and the blade motor 86. The folding roller pair 42 and the blade 43 are driven under the control of the folding process control section 63. The sheet bundle B is thus folded.

In the second embodiment shown in FIG. 10, the second sheet P of the sheet bundle B in the arrangement order therein is the advanced sheet PF. The advanced sheet PF is, however, not limited to the second sheet P of the sheet bundle B in the arrangement order therein. Any of the third and subsequent sheets P of the sheet bundle B in the arrangement order therein may be set as the advanced sheet PF. The above description has been made with reference to the case where the advanced sheet PF is put on standby in the stapling process section 27. The location where the advanced sheet PF is put on standby is, however, not limited to the stapling process section 27. The discharge process section 28 can instead be the location where the advanced sheet PF is put on standby.

An example in which the sheet P of the sheet bundle B positioned by two positions behind the excess ink sheet PL in the arrangement order is set as the advanced sheet PF will be described. In this example, the sheet P of the sheet bundle B positioned by two positions behind the excess ink sheet PL in the arrangement order is set as the advanced sheet PF, and the printing order of the advanced sheet PF is advanced to a position earlier than the arrangement order of the ink excess sheet PL in the sheet bundle B. The printing order of the advanced sheet PF is advanced to the position immediately behind the excess ink sheet PL. That is, in this example, after the excess ink sheet PL is printed, the advanced sheet PF is printed. For example, there is a conceivable case where the third sheet P of the sheet bundle B in the arrangement order therein is the advanced sheet PF, as shown in FIG. 11.

Figure 11:
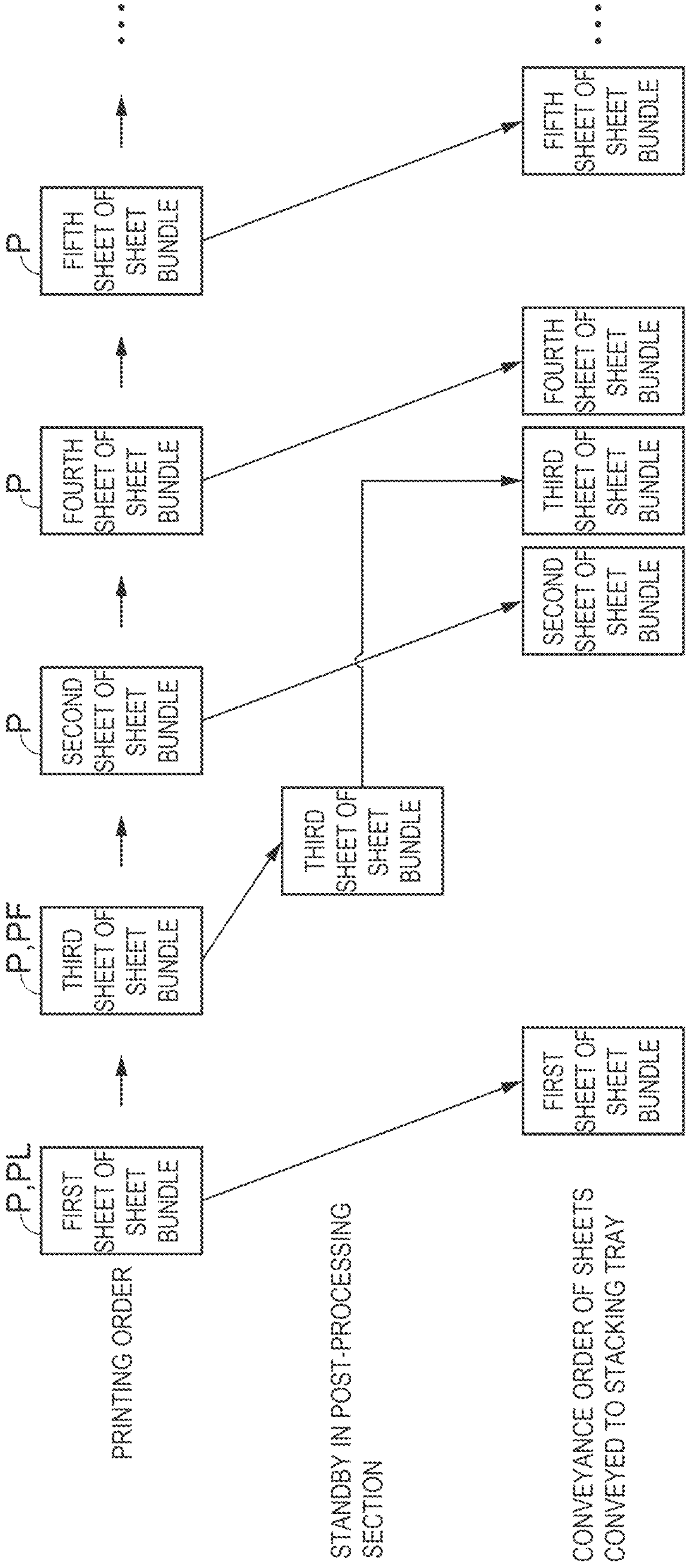
FIG. 11 diagrammatically illustrates the flow of a plurality of sheet that constitute a sheet bundle in the third embodiment.

The third embodiment shown in FIG. 11 is suitable, for example, for a case where the first sheet P of the sheet bundle B in the arrangement order therein is the ink excess sheet PL.

In this example, the printing order of the third sheet P of the sheet bundle B is advanced to the second position immediately behind the ink excess sheet PL. The third embodiment shown in FIG. 11 differs from the second embodiment shown in FIG. 10 in that the third sheet P of the sheet bundle B in the arrangement order therein is set as the advanced sheet PF. Except for this point, the processes are carried out by the control circuit 7 in the same manner in the second embodiment shown in FIG. 10. How the processes are carried out by the control circuit 7 will therefore be described in the third embodiment shown in FIG. 11.

In the third embodiment shown in FIG. 11, the sheet P of the sheet bundle B positioned by two positions behind the excess ink sheet PL in the arrangement order is set as the advanced sheet PF. The advanced sheet PF is, however, not limited to the sheet P of the sheet bundle B positioned by two positions behind the excess ink sheet PL in the arrangement order. The sheet P of the sheet bundle B positioned by at least two positions behind the excess ink sheet PL in the arrangement order can be set as the advanced sheet PF. Any of the sheets P of the sheet bundle B positioned by three or more positions behind the excess ink sheet PL in the arrangement order can therefore be set as the advanced sheet PF. In any of the cases described above, the printing order of the advanced sheet PF is advanced to the position immediately behind the excess ink sheet PL.

In the third embodiment shown in FIG. 11, the control circuit 7 of the printing system 1 advances the printing order of the advanced sheet PF, which is positioned at least two positions behind the ink excess sheet PL in the arrangement order of the sheet bundle B, to the position immediately behind the ink excess sheet PL. After causing the advanced sheet PF to be printed, the control circuit 7 causes the advanced sheet PF to stand by in the post-processing section 23 and then to be conveyed to the stacking tray 41 in the arrangement order in the sheet bundle B. Drying the ink attached to the excess ink sheet PL can be thus facilitated by using the period for which the advanced sheet PF stands by in the post-processing section 23. The situation in which the ink is transferred to the adjacent sheet P is thus likely to be avoided when the plurality of sheets P are stacked on each other. Furthermore, in the printing system 1, the advanced sheet PF is conveyed to the stacking tray 41 while printing is performed on the sheet P next to the advanced sheet PF in the arrangement order in the sheet bundle B. As a result, an increase in the period required for the process of folding the sheet bundle B is likely to be avoided.

Figure 12:
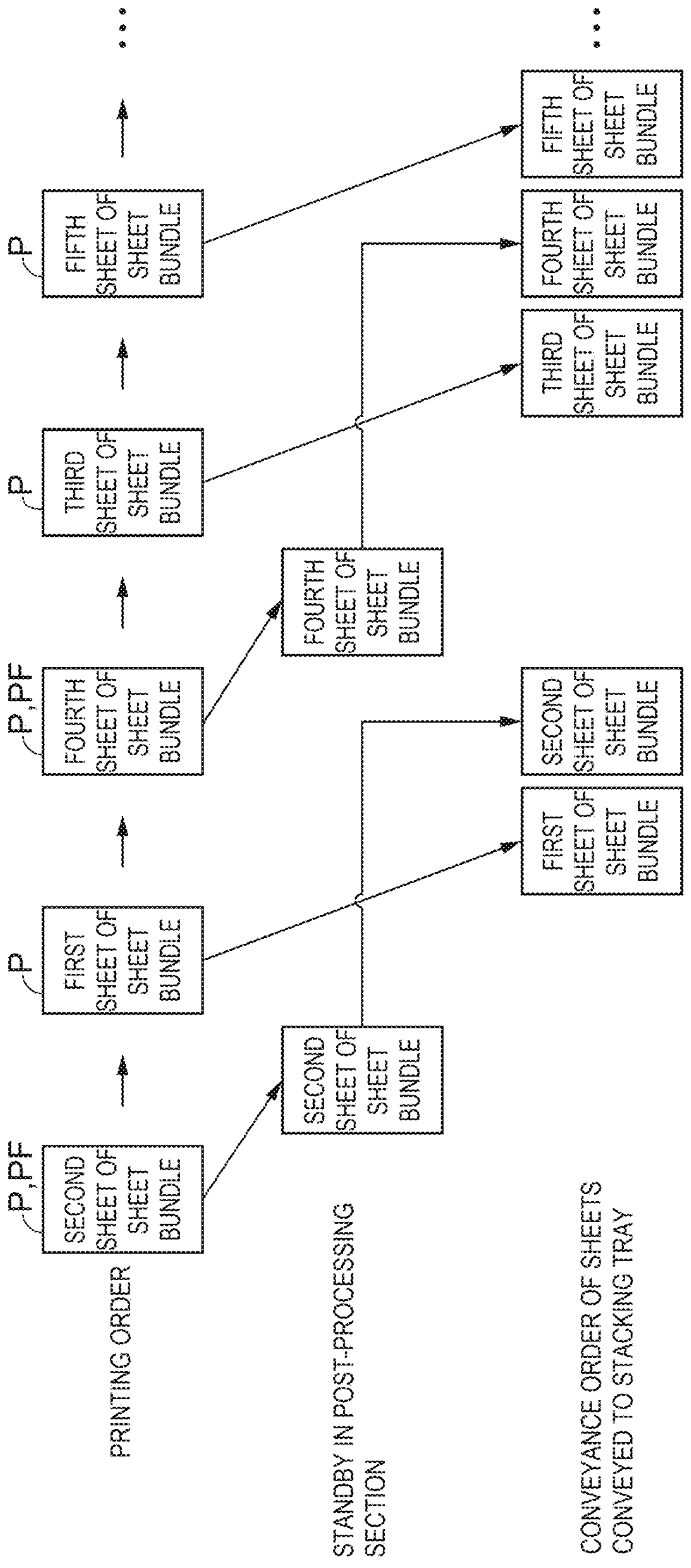
FIG. 12 diagrammatically illustrates the flow of a plurality of sheet that constitute a sheet bundle in the fourth embodiment.
Figure 13:
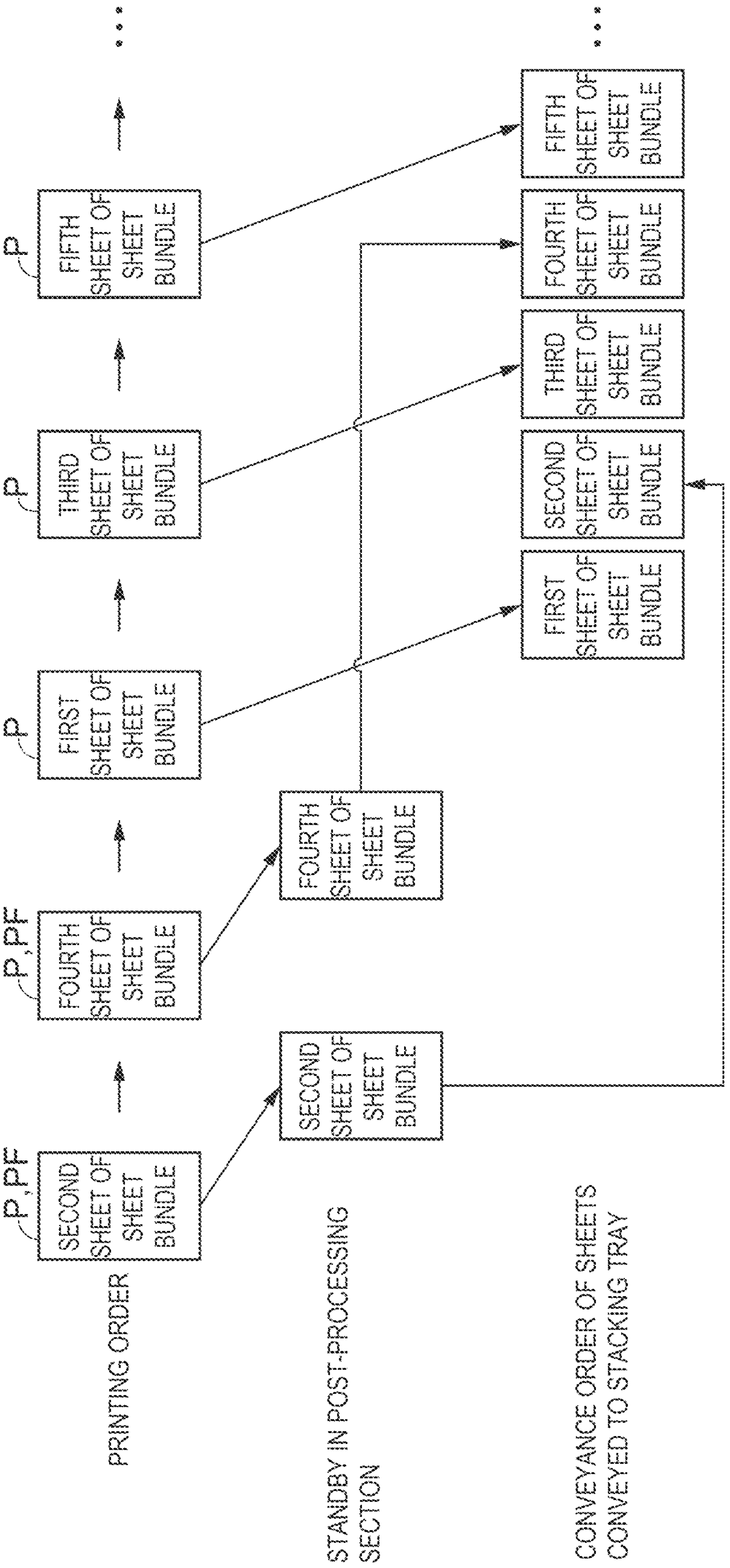
FIG. 13 diagrammatically illustrates the flow of a plurality of sheet that constitute a sheet bundle in a fifth embodiment.

The second embodiment shown in FIG. 10 and the third embodiment shown in FIG. 11 each show a case where the sheet bundle B contains a single advanced sheet PF. The number of advanced sheets PF contained in the sheet bundle B is, however, not limited to one. For example, the second and third embodiments are also applicable to a case where the sheet bundle B contains two advanced sheets PF, as shown in FIG. 12. In the fourth embodiment shown in FIG. 12, the second and fourth sheets P of the sheet bundle B in the arrangement order therein are each set as the advanced sheet PF. The fourth embodiment shown in FIG. 12 also provides the same effects as those provided by the second embodiment shown in FIG. 10 and the third embodiment shown in FIG. 11. Furthermore, in the fourth embodiment shown in FIG. 12, the position to which the fourth sheet P is advanced can be changed, as shown in FIG. 13. A fifth embodiment shown in FIG. 13 also provides the same effects as those provided by the fourth embodiment shown in FIG. 12. In the fifth embodiment shown in FIG. 13, the fourth sheet P may be put on standby in the discharge process section 28.

Figure 14:
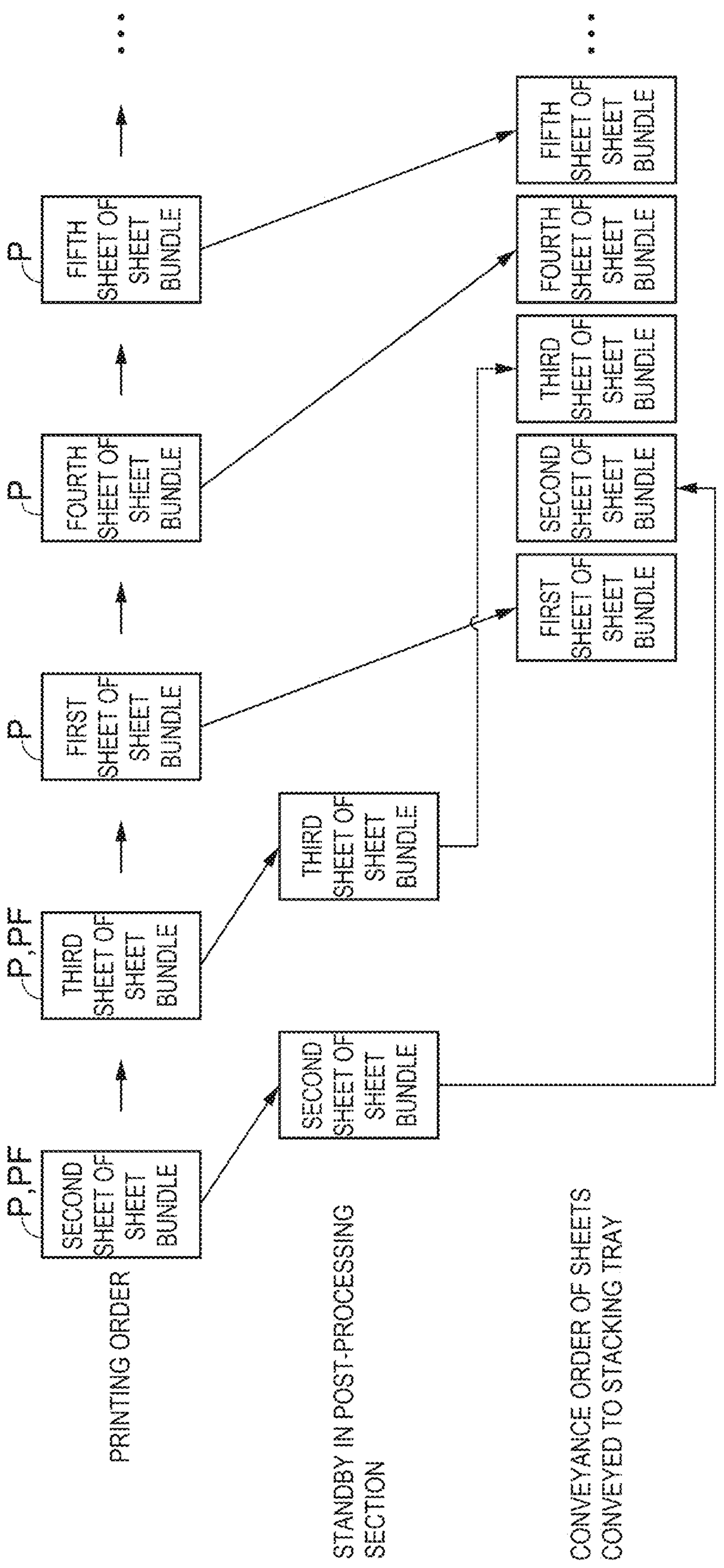
FIG. 14 diagrammatically illustrates the flow of a plurality of sheet that constitute a sheet bundle in a sixth embodiment.

Furthermore, when a sheet bundle B contains two advanced sheets PF, two sheets P continuous with each other in the arrangement order in the sheet bundle B can each be set as the advanced sheet PF. For example, the second and third sheets P of the sheet bundle B in the arrangement order therein can each be set as the advanced sheet PF, as shown in FIG. 14. A sixth embodiment shown in FIG. 14 also provides the same effects as those provided by the fourth embodiment shown in FIG. 12. In the sixth embodiment shown in FIG. 14, the third sheet P may be put on standby in the discharge process section 28. The method for controlling the printing system 1 is also applicable to the case where a sheet bundle B contains two advanced sheets PF, as described above. Furthermore, the method for controlling the printing system 1 is also applicable to a case where a sheet bundle B contains three or more advanced sheets PF.

In the printing system 1 described above, the post-processing section 23 is not limited to the stapling process section 27 or the discharge process section 28. The post-processing section 23 may be only one of the stapling process section 27 and the discharge process section 28. The post-processing section 23 may, for example, instead be a punch process section or a shift process section. The punch process is the process of punching holes through a sheet P. The shift process is the process of placing a plurality of sheets P at positions shifted from each other. The post-processing section 23 may include at least one of the stapling process section 27, the discharge process section 28, the punch process section, and the shift process section. Furthermore, the post-processing section 23 may include the four sections described above: the stapling process section 27, the discharge process section 28, the punch process section, and the shift process section. A stapler can be added to the folding process section 22. Adding a stapler to the folding process section 22 allows a center-folded sheet bundle B to be stapled. Stapling a center-folded sheet bundle B is also called bookbinding or saddle stitching.

Figure 15:
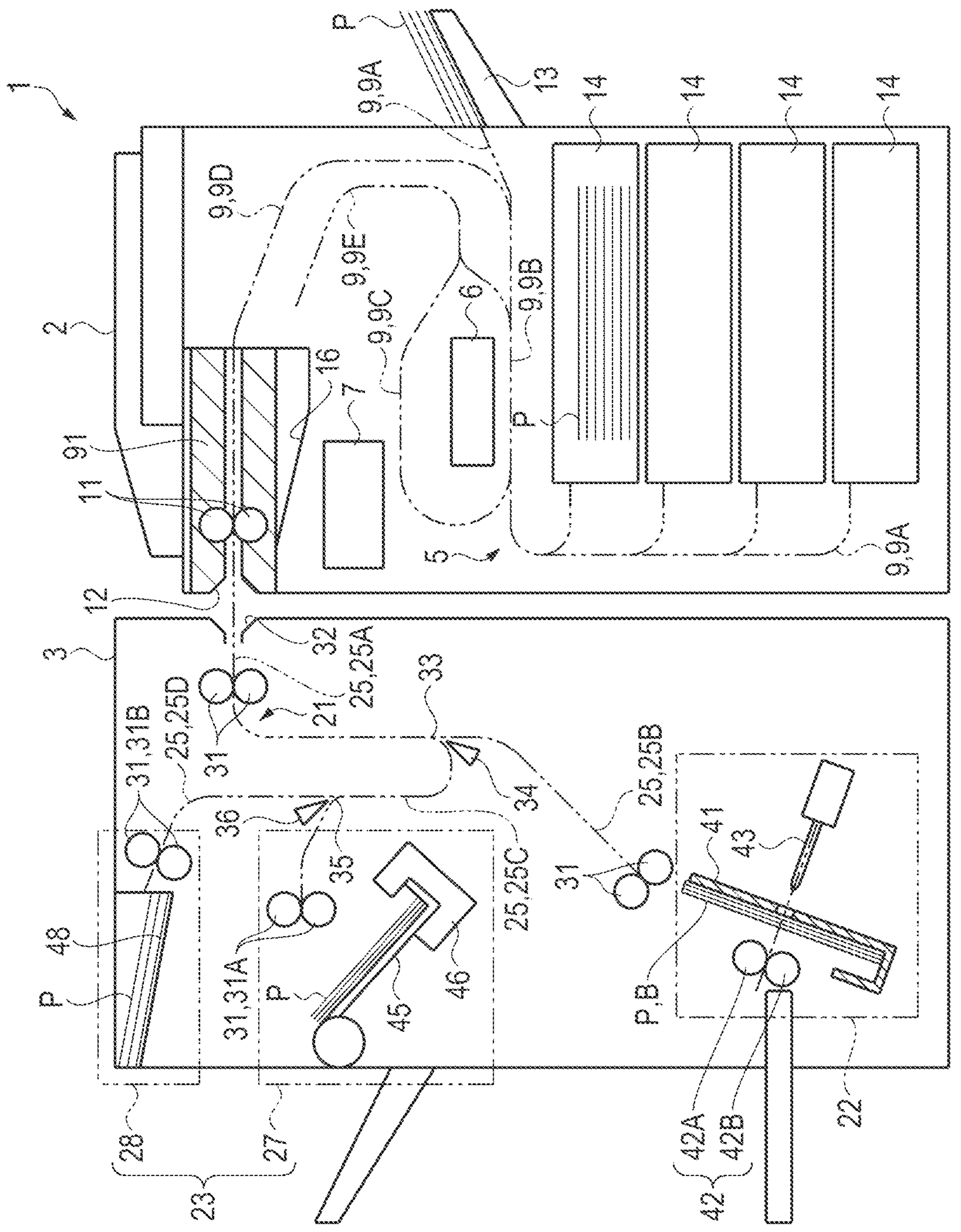
FIG. 15 is a diagrammatic view for illustrating the configuration of a second example of the printing system.

A second example of the printing system 1 will be described. In the printing system 1 according to the second example, a relay unit 91 is added to the printing apparatus 2, as shown in FIG. 15. Except for this point, the printing system 1 according to the second example has the same configuration as that of the printing system 1 according to the first example. Therefore, among the components of the printing system 1 according to the second example, the same components as those of the printing system 1 according to the first example have the same reference characters as those of the printing system 1 according to the first example, and will not be described in detail.

The relay unit 91 is disposed in the first stacker 16 of the printing apparatus 2. The relay unit 91 extends the sheet discharging path 9D of the printing apparatus 2. The relay unit 91 is an apparatus that couples the sheet discharging path 9D of the printing apparatus 2 to the reception path 25A of the post-processing apparatus 3. In the printing system 1 according to the second example, a sheet P printed by the printing head 6 is conveyed from the sheet discharging path 9D to the reception path 25A of the post-processing apparatus 3 via the relay unit 91. The configuration of the post-processing apparatus 3, the contents of the processes, and the operation of each of the processes are the same as those in the first example. In the printing system 1 according to the second example, the discharge port 12 of the printing apparatus 2 is provided as a part of the relay unit 91.

Accordingly, the position of the reception port 32 of the post-processing apparatus 3 differs from the position in the first example. The printing system 1 according to the second example also provides the same effects as those provided by the printing system 1 according to the first example.

Figure 16:
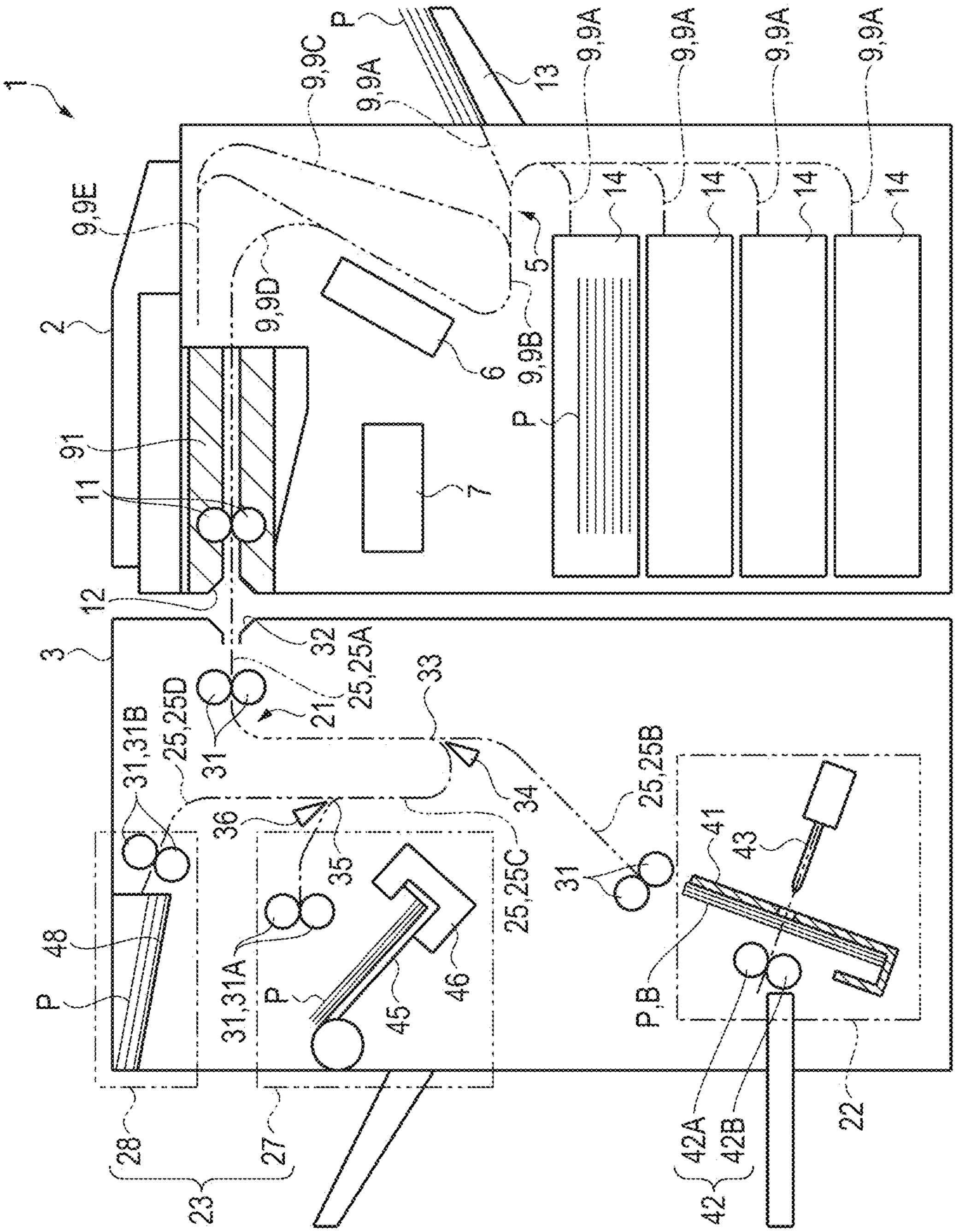
FIG. 16 is a diagrammatic view for illustrating the configuration of a third example of the printing system.

A third example of the printing system 1 will be described. In the printing system 1 according to the third example, the position and the posture of the printing head 6 of the printing apparatus 2 differ from those in the second example, as shown in FIG. 16. Except for this point, the printing system 1 according to the third example has the same configuration as that of the printing system 1 according to the second example. Therefore, among the components of the printing system 1 according to the third example, the same components as those of the printing system 1 according to the second example have the same reference characters as those of the printing system 1 according to the second example, and will not be described in detail. Also in the printing system 1 according to the third example, the relay unit 91 is added to the printing apparatus 2, as in the second example. The printing system 1 according to the third example also provides the same effects as those provided by the printing system 1 according to the first example.

Figure 17:
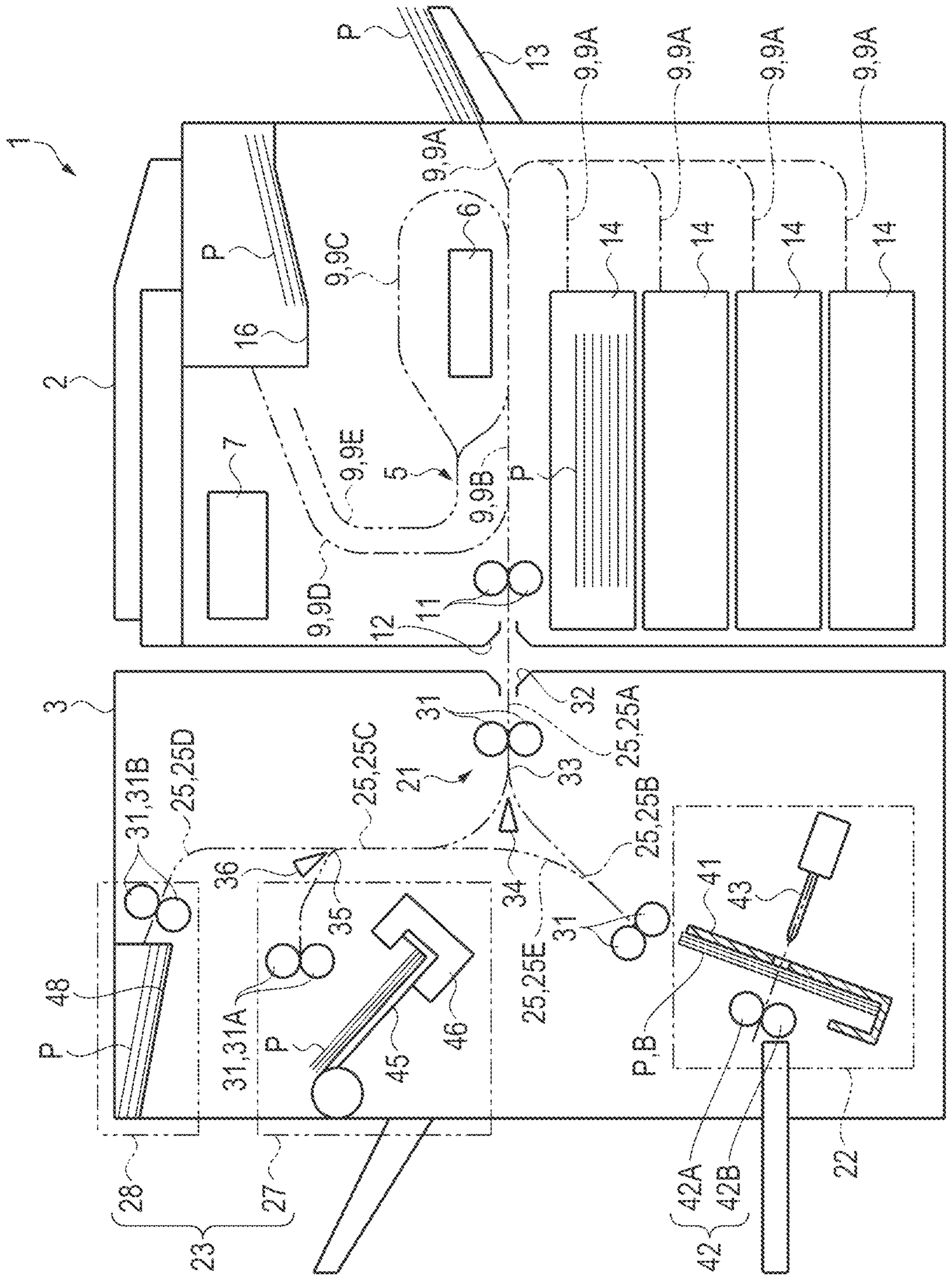
FIG. 17 is a diagrammatic view for illustrating the configuration of a fourth example of the printing system.

A fourth example of the printing system 1 will be described. In the printing system 1 according to the fourth example, a shortcut path 25E is added to the post-processing apparatus 3, as shown in FIG. 17. Except for this point, the printing system 1 according to the fourth example has the same configuration as that of the printing system 1 according to the first example. Therefore, among the components of the printing system 1 according to the fourth example, the same components as those of the printing system 1 according to the first example have the same reference characters as those of the printing system 1 according to the first example, and will not be described in detail. The shortcut path 25E is an example of a third conveyance path.

The shortcut path 25E is a part of the post-processing conveyance path 25. The shortcut path 25E is a path extending from the post-processing section 23 to the stacking tray 41. The shortcut path 25E extends from the post-processing section 23 to the stacking tray 41 without passing through the first branch point 33. The first branch point 33 is an example of a branch point. The printing system 1 having the shortcut path 25E allows the first sheet P or the advanced sheet PF of the second sheet bundle B2 to be conveyed from the post-processing section 23 to the stacking tray 41 without passing through the first branch point 33. The time required for the process of folding a sheet bundle B can thus be shortened.

When the sheet P is conveyed to the folding process section 22 via the shortcut path 25E, the sheet P are reversed upside down as compared with the case where the sheet P is conveyed from the stapling path 25C to the folding process path 25B via the first branch point 33. It is therefore preferable that the conveyance along the shortcut path 25E is applied to a case where double-side printing is performed on the first sheet P or the advanced sheet PF of the second sheet bundle B2. Changing the printing order of the front and rear sides of the first sheet P or the advanced sheet PF of the second sheet bundle B2 when the double-side printing is performed thereon and reversing the sheet P upside down through the conveyance performed by the shortcut path 25E allows appropriate front and rear sides of the sheet to be provided at the end. The shortcut path 25E in the fourth example is also applicable to the second and third examples.

In the printing system 1 and the method for controlling the printing system 1 described above, the number of positions to which the printing order of the advanced sheet PF is advanced may be determined in accordance with the amount of ink to be ejected to the ink excess sheet PL. For example, it is preferable to employ a method for advancing the printing order of the advanced sheet PF in accordance with the amount of ink ejected from the printing head 6 to the ink excess sheet PL. According to the method described above, the period for which the advanced sheet PF stands by can be prolonged in accordance with the amount of ink to be ejected to the ink excess sheet PL.

What is claimed is:

1. A printing system comprising:

a printing apparatus including a printing section that ejects a liquid to perform printing on a medium with the liquid;

a post-processing apparatus including a folding process section that performs a folding process of folding a medium bundle formed of a plurality of the media on which the printing apparatus performs the printing; and a control apparatus that controls the printing apparatus and the post-processing apparatus, wherein the printing apparatus further includes a first conveyance portion that conveys the plurality of media, which constitute the medium bundle, to the post-processing apparatus in a printing order, the post-processing apparatus further includes a second conveyance portion that conveys the media received from the printing apparatus in the printing order, and a post-processing section that performs post-processing different from the folding process on the media, the folding process section includes a tray in which the plurality of media are sequentially stacked on each other whenever conveyed by the second conveyance portion to form the medium bundle, and a folding mechanism that performs the folding process on the formed medium bundle, and the control apparatus, assuming that the folding process is performed on a plurality of the medium bundles, that one of the plurality of medium bundles is a first medium bundle, and that the medium bundle following the first medium bundle is a second medium bundle, causes the printing apparatus to start a printing process on a first medium of the medium of the second medium bundle after printing on a last medium of the media of the first medium bundle ends but before the folding process on the first medium bundle starts, and puts the printed first medium on standby in the post-processing section until the folding process on the first medium bundle ends.

2. The printing system according to claim 1, wherein the control apparatus causes the second conveyance portion to convey the first medium from the post-processing section to the tray after the folding process on the first medium bundle ends.

3. The printing system according to claim 1, wherein the post-processing section includes stapling process section, and the control apparatus puts the first medium on standby in the stapling process section of the post-processing section.

4. The printing system according to claim 1, wherein the post-processing section includes a discharge process section that discharges a medium, and the control apparatus puts the first medium on standby in the discharge process section of the post-processing section.

5. The printing system according to claim 1, wherein the post-processing section includes a stapling process section and a discharge process section that discharges a medium, and the control apparatus puts the first medium on standby in one of the stapling process section and the discharge process section.

6. The printing system according to claim 5, wherein the control apparatus advances a printing order of the medium to which an amount of the liquid ejected from the printing section greater than a predetermined amount is ejected out of the media of the second medium bundle to a first position in an arrangement order of the media in the second medium bundle, causes the printing section to perform printing on the medium as the first medium, then puts the first medium on standby in the post-processing section, and causes the second conveyance portion to convey the first medium to the tray in the arrangement order.

7. The printing system according to claim 1, wherein the post-processing apparatus includes a reception section that receives the medium conveyed by the first conveyance portion, the second conveyance portion has a first conveyance path along which the medium is guided from the reception section to the tray, a second conveyance path that branches off the first conveyance path between the reception section and the tray and extends to the post-processing section, and a third conveyance path that extends from the post-processing section to the tray, and the third conveyance path does not pass through a branch point at which the second conveyance path branches off the first conveyance path.

8. A method for controlling a printing system including a printing apparatus including a printing section that ejects a liquid to perform printing on a medium with the liquid, and a post-processing apparatus including a folding process section that performs a folding process of folding a medium bundle formed of a plurality of the media on which the printing apparatus performs the printing, the printing apparatus further including a first conveyance portion that conveys the plurality of media, which constitute the medium bundle, to the post-processing apparatus in a printing order, the post-processing apparatus further including a second conveyance portion that conveys the media received from the printing apparatus in the printing order, and a post-processing section that performs post-processing different from the folding process on the media, the folding process section including a tray in which the plurality of media are sequentially stacked on each other whenever conveyed by the second conveyance portion to form the medium bundle, and a folding mechanism that performs the folding process on the formed medium bundle, the method comprising assuming that the folding process is performed on a plurality of the medium bundles, that one of the plurality of medium bundles is a first medium bundle, and that the medium bundle following the first medium bundle is a second medium bundle, and causing the printing apparatus to start a printing process on a first medium of the medium of the second medium bundle after printing on a last medium of the media of the first medium bundle ends but before the folding process on the first medium bundle starts, and puts the printed first medium on standby in the post-processing section until the folding process on the first medium bundle ends.

9. The method for controlling a printing system according to claim 8, further comprising causing the second conveyance portion to convey the first medium from the post-processing section to the tray after the folding process on the first medium bundle ends.

* * * * *